(12) United States Patent
Kuspa

(10) Patent No.: US 7,623,755 B2
(45) Date of Patent: Nov. 24, 2009

(54) TECHNIQUES FOR POSITIONING AUDIO AND VIDEO CLIPS

(75) Inventor: David Kuspa, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 240 days.

(21) Appl. No.: 11/506,389

(22) Filed: Aug. 17, 2006

(65) Prior Publication Data

US 2008/0044155 A1 Feb. 21, 2008

(51) Int. Cl.
G11B 27/00 (2006.01)
G06F 3/00 (2006.01)

(52) U.S. Cl. ............ 386/55; 386/52; 386/54; 715/716; 715/719; 715/723; 715/724

(58) Field of Classification Search ............ 386/46, 386/52–55, 65, 68, 69, 80–82; 715/716–724
See application file for complete search history.

(56) References Cited

U.S. PATENT DOCUMENTS

| | | | |
|---|---|---|---|
| 5,187,571 A | 2/1993 | Braun et al. | |
| 5,598,208 A | 1/1997 | McClintock | |
| 5,613,032 A | 3/1997 | Cruz et al. | |
| 5,732,184 A | 3/1998 | Chao et al. | |
| 5,737,552 A | 4/1998 | Lavallee et al. | |
| 5,781,188 A | 7/1998 | Amiot et al. | |
| 6,243,085 B1 | 6/2001 | Roach | |
| 6,253,461 B1 | 7/2001 | Fischer | |
| 6,317,166 B1 | 11/2001 | McCutchen | |
| 6,324,335 B1 * | 11/2001 | Kanda | 386/52 |
| 6,353,461 B1 | 3/2002 | Shore et al. | |
| 6,459,711 B1 | 10/2002 | Hamaguchi et al. | |
| 6,670,966 B1 * | 12/2003 | Kusanagi | 715/723 |
| 7,024,677 B1 | 4/2006 | Snyder et al. | |
| 7,037,127 B2 | 5/2006 | Williams | |
| 7,055,100 B2 | 5/2006 | Moriwake et al. | |
| 7,073,127 B2 | 7/2006 | Zhao et al. | |
| 7,124,366 B2 | 10/2006 | Foreman et al. | |

(Continued)

OTHER PUBLICATIONS

International Search Report, Application Serial No. PCT/US07/76155, dated Sep. 22, 2008, 8 pages.

(Continued)

*Primary Examiner*—Thai Tran
*Assistant Examiner*—Mishawn Dunn
(74) *Attorney, Agent, or Firm*—Fish & Richardson P.C.

(57) ABSTRACT

Techniques and systems for positioning video and audio clips in timeline sequences. In some embodiments, a computer program product, encoded on a computer-readable medium, is operable to cause data processing apparatus to perform operations that include, in response to selection of a first clip in a first track, moving the selected first clip in a timeline sequence. The timeline sequence includes multiple matched audio and video tracks configured to serve as containers for clips, and the first clip is linked with a second clip. In response to selection of the second clip, the operations include moving the selected second clip into a track that is a non-matching track in the timeline sequence, in which the non-matching track includes a track that is not associated with a track where the first clip is located. The drag-and-drop techniques can allow independent placement of linked audio and video clips into non-matching tracks.

16 Claims, 14 Drawing Sheets

U.S. PATENT DOCUMENTS

| | | | |
|---|---|---|---|
| 7,196,722 | B2 | 3/2007 | White et al. |
| 7,199,817 | B2 | 4/2007 | Mottur et al. |
| 7,325,199 | B1 * | 1/2008 | Reid .......................... 715/723 |
| 7,356,242 | B2 | 4/2008 | Nagasawa |
| 2001/0036356 | A1 | 11/2001 | Weaver et al. |
| 2001/0040592 | A1 | 11/2001 | Foreman et al. |
| 2003/0002851 | A1 | 1/2003 | Hsiao et al. |
| 2003/0077071 | A1 | 4/2003 | Lin et al. |
| 2003/0197785 | A1 | 10/2003 | White et al. |
| 2003/0215214 | A1 | 11/2003 | Ma |
| 2004/0047208 | A1 | 3/2004 | Hoddie et al. |
| 2004/0066457 | A1 | 4/2004 | Silverstein et al. |
| 2004/0080624 | A1 | 4/2004 | Yuen |
| 2005/0034076 | A1 | 2/2005 | Belhumeur et al. |
| 2005/0094966 | A1 | 5/2005 | Elberbaum |
| 2005/0206720 | A1 | 9/2005 | Cheatle et al. |
| 2005/0285943 | A1 | 12/2005 | Cutler |
| 2006/0171453 | A1 | 8/2006 | Rohlfing et al. |
| 2006/0288288 | A1 | 12/2006 | Girgensohn et al. |
| 2007/0113182 | A1 | 5/2007 | Hollemans |
| 2007/0183768 | A1 | 8/2007 | Mottur et al. |
| 2007/0201815 | A1 | 8/2007 | Griffin |
| 2008/0019576 | A1 | 1/2008 | Senftner et al. |

OTHER PUBLICATIONS

Group Clip Editing, Chapter 18, 11 pages, Aug. 17, 2006.
Hot Shots with Premiere Pro 2.0: Multicam Editing, Tutorial Series, Part 2; 2 pages, Aug. 17, 2006.
Peter Wiggins Reviews Multicam Lite, Creativecow.net Product Review; United Kingdom; Internet: http://www.creativecow.net/articles/wiggins_peter/multicam_rev/; (1 of 16) Nov. 24, 2005 11:10:43 AM.
Working With Multiclips, Chapter 16, pp. 247-288, Aug. 17, 2006.
Media 100—Advanced Editing Systems, available at: http://www.mwdia100.com/products/php, printed on Jul. 9, 2009.
"Avid NewsCutter Adrenaline FX," http://www.virtualmediaonline.com/products/Newscutter%20Adrenaline%20Overview.html, 69 pages, (accessed on Apr. 4, 2006).
"Hot Shots with Premiere Pro 2.0: Multicarn Editing, Tutorial Series Part 2" http://ads.digitalmedianet.com/ads/servlet/click/zone?zid=117&pid=0&lookup=true&position=1 6 pages, (accessed Feb. 22, 2006).
"Hot Shots with Premiere Pro 2.0: Multicam Editing, Tutorial Series Part 2," http://ads.digitalmedianet.corn/ads/servlet/click/zone?zid=117&pid=0&lookup=true&position=1, 2 pages, (accessed on Apr. 4, 2006). **Duplicate of "White" ref below.
Mills, USPTO Office Action in U.S. Appl. No. 11/429,134, mailed Jun. 28, 2009, to be published by USPTO as part of the file history, 34 pages.
"Multicam Features" http://www.unitedmediainc.com/multicam, 2 pages, (accessed on Jan. 10, 2006).
Stitt, USPTO Office Action in U.S. Appl. No. 11/377,885, mailed Jun. 9, 2008, to be published by USPTO as part of the file history, 16 pages.
Stitt, USPTO Office Action in U.S. Appl. No. 11/377,885, mailed Jan. 14, 2009, to be published by USPTO as part of the file history, 17 pages.
Stitt, USPTO Office Action in U.S. Appl. No. 11/377,885, mailed Apr. 29, 2009, to be published by USPTO as part of the file history, 16 pages.
White, Charlie, "Hot Shots with Premiere Pro 2.0: Multicam Editing, Tutorial Series, Part 2," http://www.digitalvideoediting.com/articles/viewarticle.isp?id=36989, 9 pages, (accessed on Feb. 22, 2006).

* cited by examiner

TECHNIQUES FOR POSITIONING AUDIO AND VIDEO CLIPS

BACKGROUND

The present disclosure relates to video and audio editing techniques using various video and audio sources.

Software, such as Adobe® Premiere® Pro software by Adobe Systems Inc. of San Jose, Calif., USA, can be used to store and arrange video clips on video tracks and audio clips on audio tracks. Premiere® Pro can store multiple video clips on multiple video tracks and can facilitate the management of playing video from the video tracks using various video content and multiple video sources, including multiple-camera sources. The video and audio clips can be arranged in the software to play back video with multiple scenes from the video clips with sound mixed from multiple audio tracks. The software allows the clips to be arranged in a non-sequential order, and facilitates the use of personalized graphics, text, and visual effects to appear in the video during play back.

SUMMARY

This specification describes technologies relating to video and audio editing. In general, one aspect of the subject matter described in this specification can be embodied in a computer program product, encoded on a computer-readable medium, that is operable to cause data processing apparatus to perform operations including, in response to selection of a first clip in a first track, moving the selected first clip in a timeline sequence, where the timeline sequence includes multiple, matched audio and video tracks configured to serve as containers for clips. The first clip is linked with a second clip. The operations also include, in response to selection of the second clip, moving the selected second clip into a track that is a non-matching track in the timeline sequence, where the non-matching track includes a track that is not associated with a track where the first clip is located. Other embodiments of this aspect include corresponding systems, apparatus, and methods.

These and other embodiments can optionally include one or more of the following features. The first clip or the second clip can include embedded timeline sequences. The first clip can be a first video clip, the first track can be a first video track, and the second clip can be a first audio clip. The timeline sequence can have a second track including a first audio track. The matched audio and video tracks can include the second and first tracks, and the non-matching track can be a second audio track.

The selection of the first clip in the first track can include a detection of a selector selection. After the selection of the first clip in the first track, the selection of the second clip can include selecting the second clip when a selector cursor moves to a track compatible with the second clip, where the audio tracks are compatible with audio clips and the video tracks are compatible with video clips. A position of the first clip can be locked in the timeline sequence when the selector cursor is moved to a track that is incompatible with the first clip, where the first clip can be locked to a lowest compatible track.

The operations can also include, in response to deselection of either the first or second clips, dropping the first clip into the timeline sequence, and dropping the second clip into the position in the timeline sequence. The dropping of the first clip and the second clip can involve overwriting portions of clips existing in the timeline sequence at locations where the first and second clips are dropped. A position of the first clip can be locked onto a compatible track in response to a selection of a locking key, where the locking key can include the selector or another selector.

In some embodiments, the first clip can be a first audio clip, the first track can be a first audio track, and the second clip can be a first video clip. The timeline sequence can include a second track that can be a first video track. The matched audio and video tracks can include the first and second tracks, and the non-matching track can be a second video track.

In general, another aspect of the subject matter described in this specification can be embodied in a system that includes a user interface device and one or more computers operable to interact with the user interface device and to perform the following operations. The operations include, in response to selection of a first clip, dragging the first clip in a timeline sequence, where the timeline sequence includes multiple, matched audio and video tracks. The multiple, matched audio and video tracks in the timeline sequence are configured to serve as containers for clips, where the first clip is linked with a second clip. The operations include, in response to selection of the second clip, dragging the second clip into a non-matching track in the timeline sequence before the first clip is dropped into a first track in the timeline sequence, in which the non-matching track includes a track that is not matched with a track at a position of the first clip. The operations further include, in response to deselection of the first clip or second clip, dropping the first clip in the first track and dropping the second clip in the non-matching track. Other embodiments of this aspect include corresponding methods, apparatus, and computer program products.

These and other embodiments can optionally include one or more of the following features. The first clip can be a first video clip, the first track can be a first video track, and the second clip can be a first audio clip. The timeline sequence can include a second track that can be a first audio track. The matched audio and video tracks can include the second and first tracks, and the non-matching track can be a second audio track.

Before dropping the first clip in the first track, the system can detect movement of a selector cursor from tracks compatible with the first clip to tracks incompatible with the first clip, in which the audio tracks are compatible with audio clips, and the video tracks are compatible with video clips. The system can also trigger the selection of the second clip when the selector cursor is detected to have moved to tracks incompatible with the first clip. The system can lock a position of the first clip on a lowest compatible track when the selector cursor is moved to tracks incompatible with the first clip. The system can also lock the first clip onto a position in a compatible track in response to a selection of a locking key, where the locking key can include the selector or another selector.

In some embodiments, the first clip can be a first audio clip, the first track can be a first audio track, and the second clip can be a first video clip. The timeline sequence can include a second track that can be a first video track. The matched audio and video tracks can include the first and second tracks, and the non-matching track can include a second video track. At least one of the first or second clips can include embedded timeline sequences.

In general, another aspect of the subject matter described in this specification can be embodied in a method for editing video and audio clips. The method involves, in response to selection of a first clip, dragging the first clip in a timeline sequence. The timeline sequence includes multiple, matched audio and video tracks, where the multiple, matched audio and video tracks in the timeline sequence are configured to serve as containers for clips, in which the first clip is linked with a second clip. The method also includes, in response to selection of the second clip, dragging the second clip into a non-matching track in the timeline sequence before the first clip is dropped in a first track in the timeline sequence. The non-matching track includes a track that is not matched with a track at a position of the first clip. In response to deselection of the first clip or second clip, the method involves dropping the first clip in the first track and dropping the second clip in the non-matching track. Other embodiments of this aspect include corresponding systems, apparatus, and computer program products.

These and other embodiments can optionally include one or more of the following features. The first clip can include a first video clip, and the first track can include a first video track. The second clip can include a first audio clip. The timeline sequence can include a second track that can include a first audio track. The matched audio and video tracks can include the second and first tracks, and the non-matching track can include a second audio track. At least one of the first or second clips can include embedded timeline sequences.

The method can include locking the first clip into a lowest compatible track when the first clip is detected to be dragged to a track that is incompatible with the first clip. The method can also include locking the first clip onto a position in a compatible track in response to a selection of a locking key, in which the locking key can include the selector or another selector.

In some embodiments, the first clip can be a first audio clip, the first track can be a first audio track, and the second clip can be a first video clip. The timeline sequence can include a second track that can be a first video track. The matched audio and video tracks can include the first and second tracks, and the non-matching track can include a second video track.

Particular embodiments of the disclosure can be implemented to realize one or more of the following advantages. There can be multiple tracks of video clips in a timeline sequence, in which each track includes video clips from different video sources. In other words, the timeline sequence can serve as a container for all or portions of one or more tracks, and each track can serve as a container for all or portions of one or more of the clips. Each video clip can have a corresponding audio clip, and each video track can have a corresponding audio track.

An editing technique can allow users to drag and drop audio and video clips onto non-matching tracks, where each audio clip is linked and synchronized with a video clip, and the audio clips can have a different track number from their linked video clips. The linked audio and video clips can be placed onto non-matching tracks with a single drag and drop procedure, avoiding the need for separate steps, where the linked audio and video clips are positioned into matching tracks, unlinked, and relocated to non-matching tracks. The linked audio and video clips can individually be placed into respective audio and video tracks in a nonlinear timeline sequence. In some embodiments, the user can independently drag and drop the linked tracks in a timeline sequence with only a single selection with a selector, such as a mouse. When the selector is released, the linked tracks are dropped into their respective track locations.

The drag-and-drop technique allows a user to make modifications to clip locations among multiple tracks in the middle of a drag-and-drop. A user can change the locations of the audio and video clips within or between tracks before dropping the clips into a track, such as by deselecting the selector. The technique can allow users to change the locations of clips in multiple tracks in the timeline sequence before dropping the clips into their desired tracks and potentially overwrite desired content. Any number of changes can be made to the track location of each of the linked audio and video clips before the clips are dropped into their desired audio and video tracks.

The details of one or more embodiments of the disclosure are set forth in the accompanying drawings and the description below. Other features, aspects, and advantages of the disclosure will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
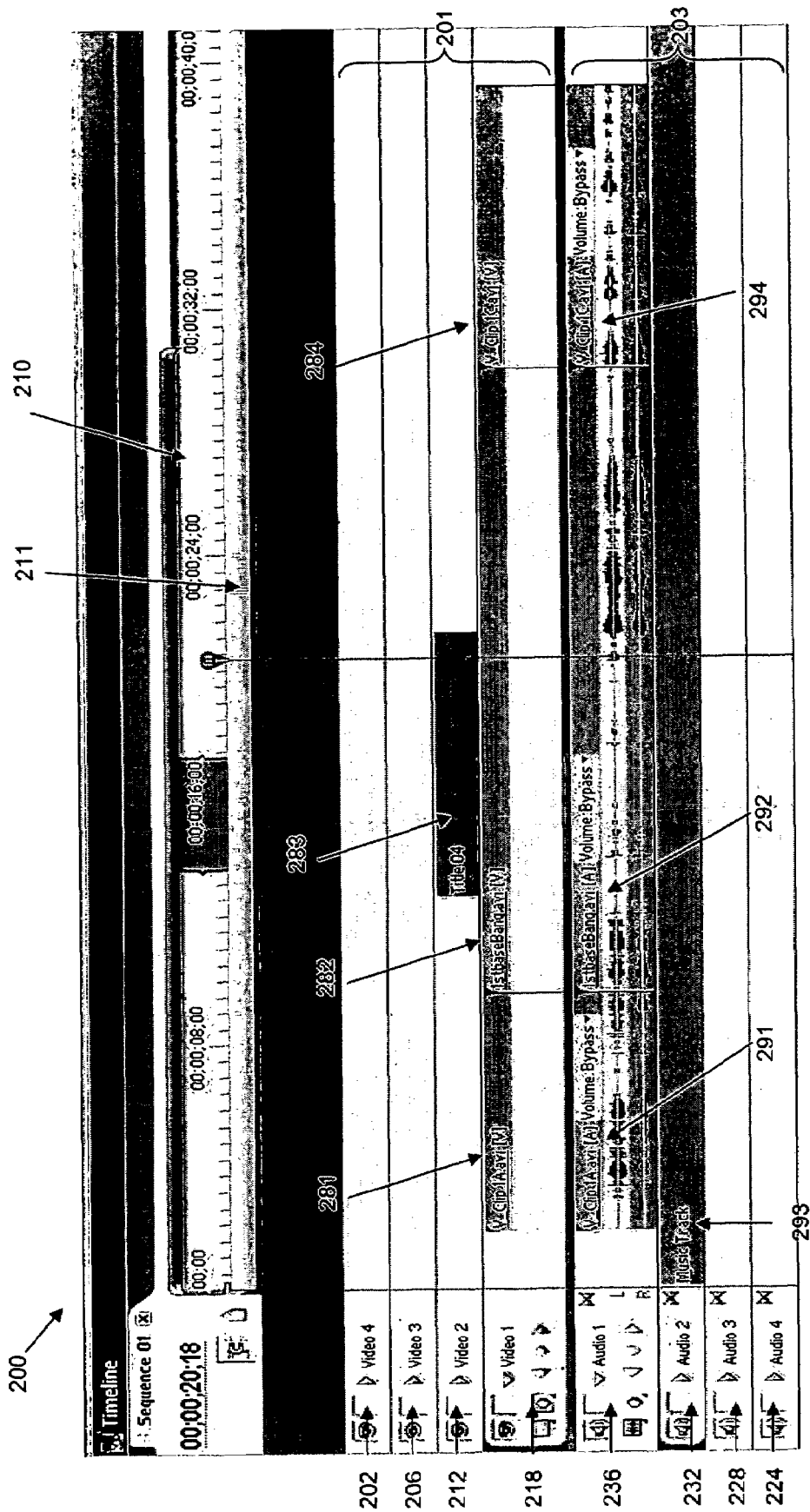
FIGS. 1A-1C show examples of a timeline sequence and moving video and audio clips.

FIG. 1A shows an example of a panel 200 for a timeline sequence. The panel 200 shown in FIG. 1A has four video tracks, Video 1 Track 218, Video 2 Track 212, Video 3 Track 206, and Video 4 Track 202, and four audio tracks, Audio 1 Track 236, Audio 2 Track 232, Audio 3 Track 228, and Audio 4 Track 224. Each track of video can include one or more video clips. Video clips can refer to a segment of a video recording, video footage with a finite duration, or a file that contains a short video item, such as an excerpt from a longer video recording. For example, video clips may be short films, or even promotional videos, such as in commercials and advertisements. Each track may also have other types of still images, frames, and moving images, such as B-roll and stock footage. In some embodiments, the clips can be sequence clips, which are clips that include multiple individual clips. In some embodiments, the video tracks 202, 206, 212, and 218 may or may not have associated or linked audio tracks 224, 228, 232, and 236. The panel 200 is not limited to the number of audio and video tracks shown, but may include any number of tracks. A timeline panel 210 shows a time duration of the tracks. The timeline panel 210 may have features to allow zooming into and out of a time duration. The timeline panel 210 may also have one or more markers to facilitate editing and synchronizing. A playhead indicator 211 in the panel 200 can help a user to understand that upon initiating playback, the playhead travels through the timeline to play the clips in the tracks in the order the clips are arranged in time from left to right.

Multiple audio or video clips may be included in each track, and each track can be fully-editable at any time. In other words, there is no limit of only one clip per track. For example, Video 1 Track 218 includes video clips 281, 282, and 284, while Audio 1 Track 236 includes audio clips 291, 292, and 294 to correspond with the respective video clips. The video tracks 202, 206, 212, and 218 are in a video track area 201 of the panel 200, and the audio tracks 224, 228, 232, and 236 are in an audio track area 203 of the panel 200. In some embodiments, each video clip in a video track can have a corresponding audio clip in an audio track, such as video clip 284 in Video 1 Track 218 corresponding with audio clip 294 in Audio 1 Track 236. The "corresponding" or "linking" of a video clip with an audio clip may refer to the association or the connection of the audio clip with the video clip. The "corresponding" or "linking" can also mean that the audio clip is synchronized with the video clip. For example, the video clip and the audio clip can both have the same time location when synchronized, and the video and audio clips can move together in time as a linked pair of clips when dragged to a new location. So, even when the video clip is moved to a different time location in the same video track or another video track, the audio clip can be synchronized with the video clip in time generally and can be moved to a same time location as the video clip, since both clips are linked together as a pair. The synchronized audio and video clips may include video footage where the sound was recorded simultaneously during filming.

In some instances, audio clips may not be associated with a video clip. For example, a music soundtrack 293 placed in audio track 232 does not have a corresponding video clip. Also, other items can be added to the tracks, such as Title overlay 283, which can overlay text onto the video in video track 212. As used herein, a "selector" generally refers to a mouse, a pointing device, a touch pad, a roller-ball, a track-ball, an optical pointing device, or a device or a set of keys on a keyboard that has the functionality to enable pointing, clicking, selecting, or dragging on-screen items, such as video and audio clips.

If edits are made to the timeline sequence, the tracks, the clips, or any of their combinations within the timeline sequence can be automatically updated to include the changes of the timeline sequence. The changes to the contents of the source or target timeline sequences can automatically be shown in a window or monitor. In some embodiments, when video tracks are created by assembling the video clips, the software program can automatically generate corresponding audio tracks if corresponding audio is available for the video clips. Also, when the timeline sequences are created or edited, the software program can automatically generate and update audio timeline sequences to link to the video timeline sequences.

Traditionally, all video clips are within video tracks in the video track area 201, and all corresponding audio clips are within the audio track area 203, where the video clips in a particular video track can only be associated with the audio clips if the audio clips are within a matching track during a drag-and-drop procedure. After the drag-and-drop procedure is completed and a clip is dropped, either the audio or video portion can be individually selected and moved to a non-matching track. For example, the video clips on Video 1 Track 218 are associated with audio clips on Audio 1 Track 236, the video clips on Video 2 Track 212 are associated with Audio 2 Track 232, the video clips on Video 3 Track 206 are associated with Audio 3 Track 228, and the video clips on Video 4 Track 202 are associated with the audio clips on Audio 4 Track 224.

Traditionally, when the linked audio/video clips are moved, they are dragged together as a pair of clips in the timeline, and the video clip must be positioned into a video track and the audio clip must be positioned into a matching audio track. For example, when video clip 284 on Video 1 Track 218 is moved along with matching audio clip 294, the audio clip 294 must be dropped into Audio 3 Track 228 if video clip 284 is positioned on Video 3 Track 206. Another example could apply when one video clip is linked with two audio clips, where the two audio tracks could stay linked together in time when dragged, and the audio clips can be dropped on separate audio tracks simultaneously. Moving the clips is typically done with multiple steps and multiple keyboard shortcuts, where the editor of the video or audio may have to perform several steps to place clips on non-matching tracks if such a procedure is even permissible for the software. Traditionally, clips have to be preloaded into a source monitor and assigned to destination tracks in advance of any movement. In some conventional software, the clips can only be moved if the clips have assignments to destination tracks.

The techniques disclosed herein can provide benefits in editing for linked video/audio clips, where the editing can be performed in fewer steps than traditional software techniques. Furthermore, the techniques disclosed herein can result in editing where the linked video/audio clips can be easily moved to non-matching tracks.

Figure 1B:
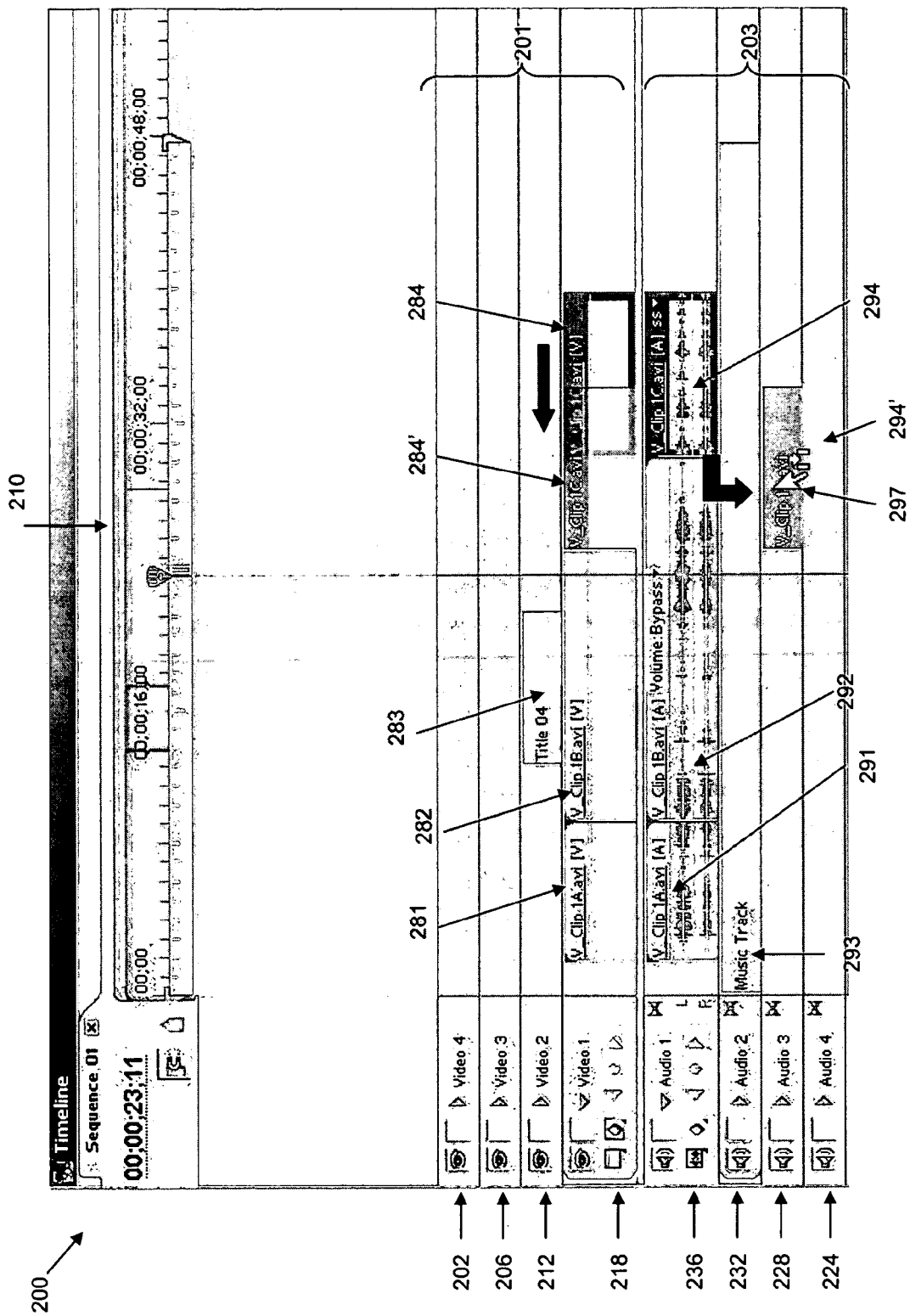
Figure 1C:
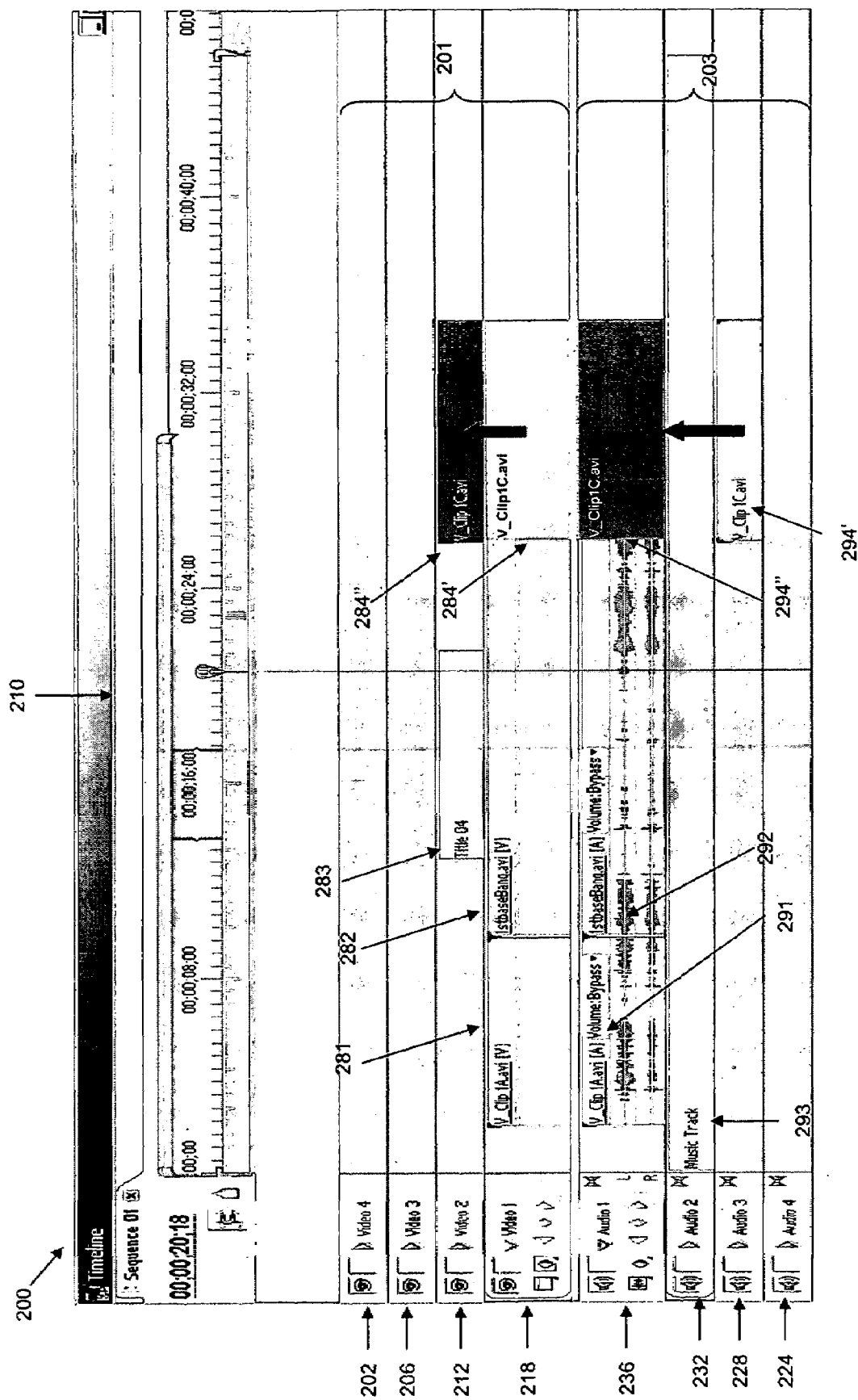

FIGS. 1A-1C show techniques where a software user can control the placement of both the video and audio of a linked audio/video clip and drop the audio clip onto an audio track that is not limited to a matching audio track for the video track where the video clip is positioned. For example, when video clip 284 on Video 1 Track 218 is moved along with matching audio clip 294, the audio clip 294 can be dropped into any audio track, while the video track position of video clip 284 can remain on Video 1 Track 218.

In some embodiments, the user can start the drag-and-drop procedure by selecting either the top (video) or bottom (audio) clip of the linked pair of clips, where the type of clip that is selected can determine the movements of the clips in the drag-and-drop procedure. For example, if a user selects a video clip in a linked audio/video clip pair, then the user can drag the video clip in the video track area 201 and position the video clip on any video track, while leaving the linked audio clip pinned to its original audio track. If the user drags the selected video clip towards the audio track area 203 and the selector crosses over to the audio track area 203, then the video clip moves downwards until the video clip is pinned to the lowest compatible video track (e.g., Video 1 Track 218), and the linked audio clip can be automatically selected to be positioned onto any audio track in the audio track area 203. In another example, if a user selects an audio clip in a linked audio/video clip pair, then the user can drag the audio clip in the audio track area 203 and position the audio clip on any audio track, while leaving the linked video clip pinned to its original video track. If the user drags the selected audio clip towards the video track area 201 and the selector crosses over to the video track area 201, then the audio clip moves upwards until the audio clip is pinned to the lowest compatible audio track (e.g., Audio 1 Track 236), and the linked video clip can be automatically selected to be positioned onto any video track in the video track area 201.

FIG. 1B shows an example of the panel 200 and in the timeline sequence when a user selects to move video clip 284 in Video 1 Track 218. When the video clip 284 is selected, the linked audio clip 294 is selected if the video clip 284' is moved to another location in the timeline sequence. So, the audio clip 294 and the video clip 284 remain synchronized in time when one of the clips are selected for movement to a new position. In some embodiments, when a selector is used to select a video clip, the video clip can move within the video track area 201, and when the selector cursor 297 moves across to the audio track area 203, the video clip 284' stays locked in its last location on Video 1 Track 218, and the audio clip 294' can move to any audio track in the audio track area 203 that is in a time location that is synchronized with the video clip. In FIG. 1B, the video clip 284' is moved along Video 1 Track 218. While the video clip 284' is being moved, a user can cross over with a selector from the video track area 201 to the audio track area 203 to move the audio clip 294' to a non-matching track, Audio 3 Track 228. The user can drop the audio clip 294' into Audio 3 Track 228 or do other movements with clips 284', 294'.

FIG. 1C shows an example where the selector crosses from the audio track area 203 to the video track area 201 to move the video clip 284' to another track, Video 2 Track 212. When the selector crosses from the audio track area 203 to the video track area 201, the audio clip 294' moves with the selector from Audio 3 Track 228 and is locked at a position in Audio 1 Track 236, the lowest compatible audio track, as the selector crosses over to the video track area 201. The user then deselects the video clip 284" to drop the video clip 284" into Video 2 Track 212 and to drop the audio clip 294" into Audio 1 Track 236. Hence, the video clip 284" and the corresponding audio clip 294" are located within non-matching tracks, and both clips 284", 294" can be moved within the same drag-and-drop procedure.

In some embodiments, when the selector cursor leaves the first track area and travels into the second track area, the location of the first clip is automatically locked at the lowest compatible track in the first track area, where the lowest compatible track is video track 1 in the first track area or audio track 1 in the second track area. At the same time, the second track (i.e., the track linked with the first track) is automatically selected when the selector leaves the first track area and travels into the second track area. The second clip can then be moved to any desired track and location in the second track area. When the selector is deselected (i.e., when the drop occurs), the first and second clips are automatically dropped into their respective locations. As a result, the user can independently drag and drop two linked clips in a timeline sequence without releasing the selector. The drag-and-drop technique allows a user to make modifications to clip locations in a middle of a drag-and-drop. In other words, a user can change the locations of the audio and video clips within or between tracks before dropping the clips into a track, such as by deselecting the selector. In some embodiments, a user can go between the audio track area and the video track area any number of times to move around audio and video clips before dropping the clips into a track.

Figure 2A:
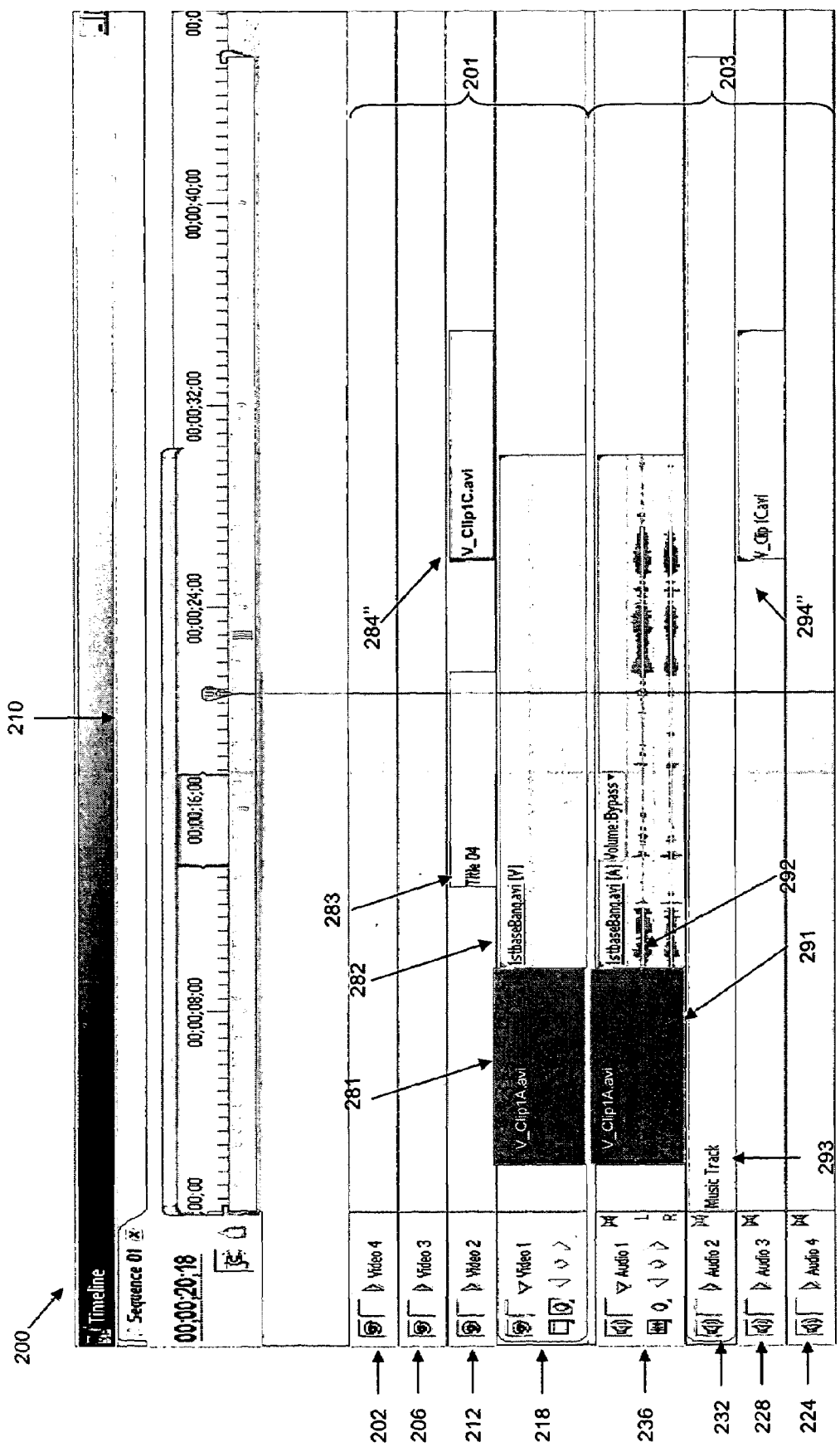
FIGS. 2A-2D show examples of moving the video and audio clips.

FIG. 2A shows an example of the panel 200, where audio clip 291 in Audio 1 Track 236 is selected. In one embodiment, when the audio clip 291 is selected, the linked video clip 281 can move to a time location that is synchronized with the audio clip 291.

Figure 2B:
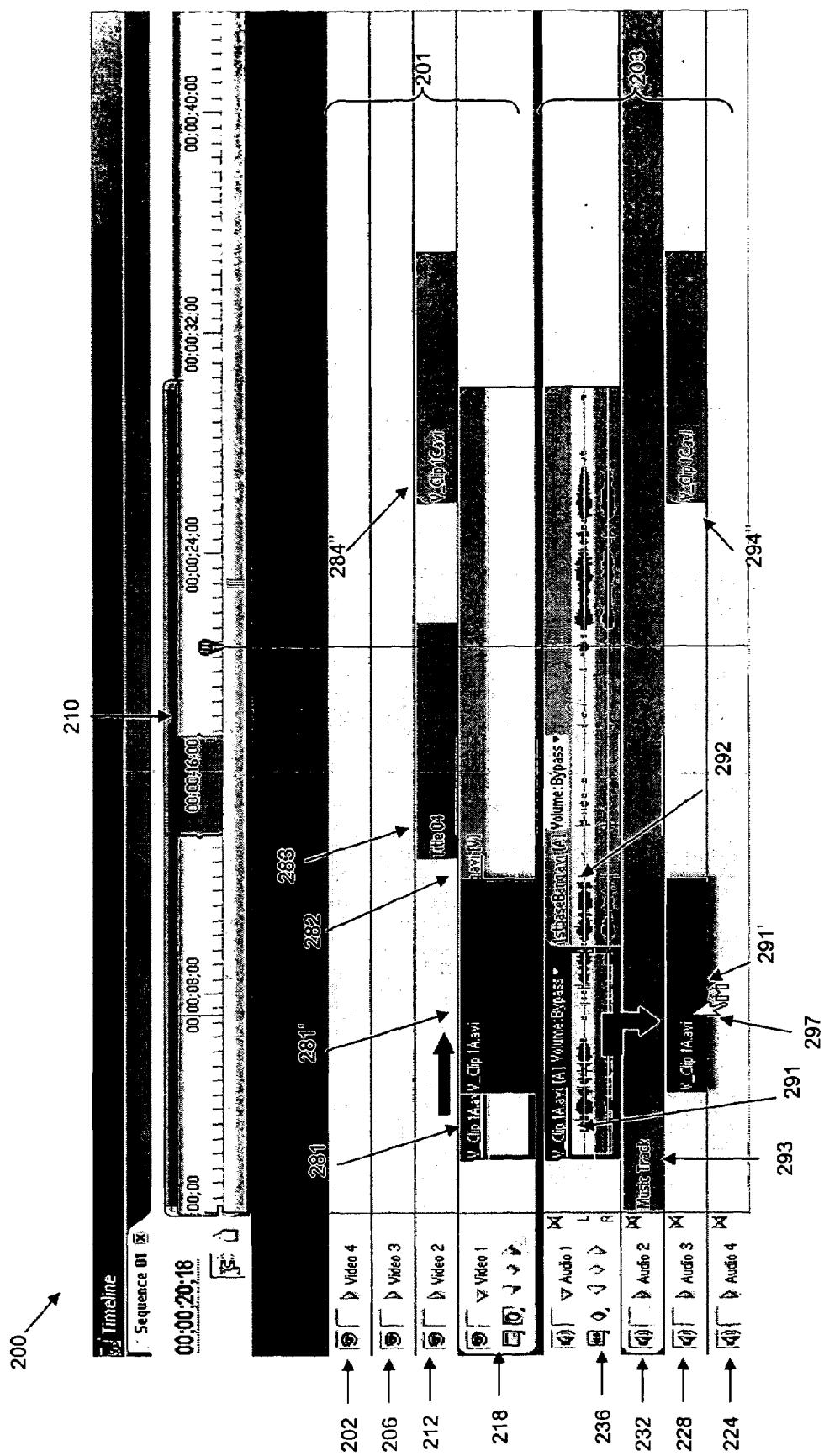

FIG. 2B shows an example of the panel 200 in the timeline sequence when audio clip 291 in Audio 1 Track 236 is moved to Audio 3 Track 228. When the audio clip 291 is selected, the linked video clip 281 is selected if the audio clip 291' is moved to another location in the timeline sequence. So, the video clip 281 and the audio clip 291 remain synchronized when one of the clips are selected for movement to a new position. In some embodiments, when a selector is used to select an audio clip, the audio clip can move to any location within the audio track area 203, and when the selector moves across to the video track area 201, the audio clip stays locked in its last position, and the video clip can move to any video track in the video track area 201 that is in a time location that is synchronized with the audio clip. In FIG. 2B, the audio clip 291' is moved along Audio 1 Track 236 and to Audio 3 Track 228. When the audio clip 291' is locked in Audio 3 Track 228 by the selector, a user can move the selector cursor 297 from the audio track area 203 to the video track area 201 to move the video clip 281'. The user can drop the video clip 281' into Video 1 Track 218 or do other movements with clips 281', 291'.

Figure 2C:
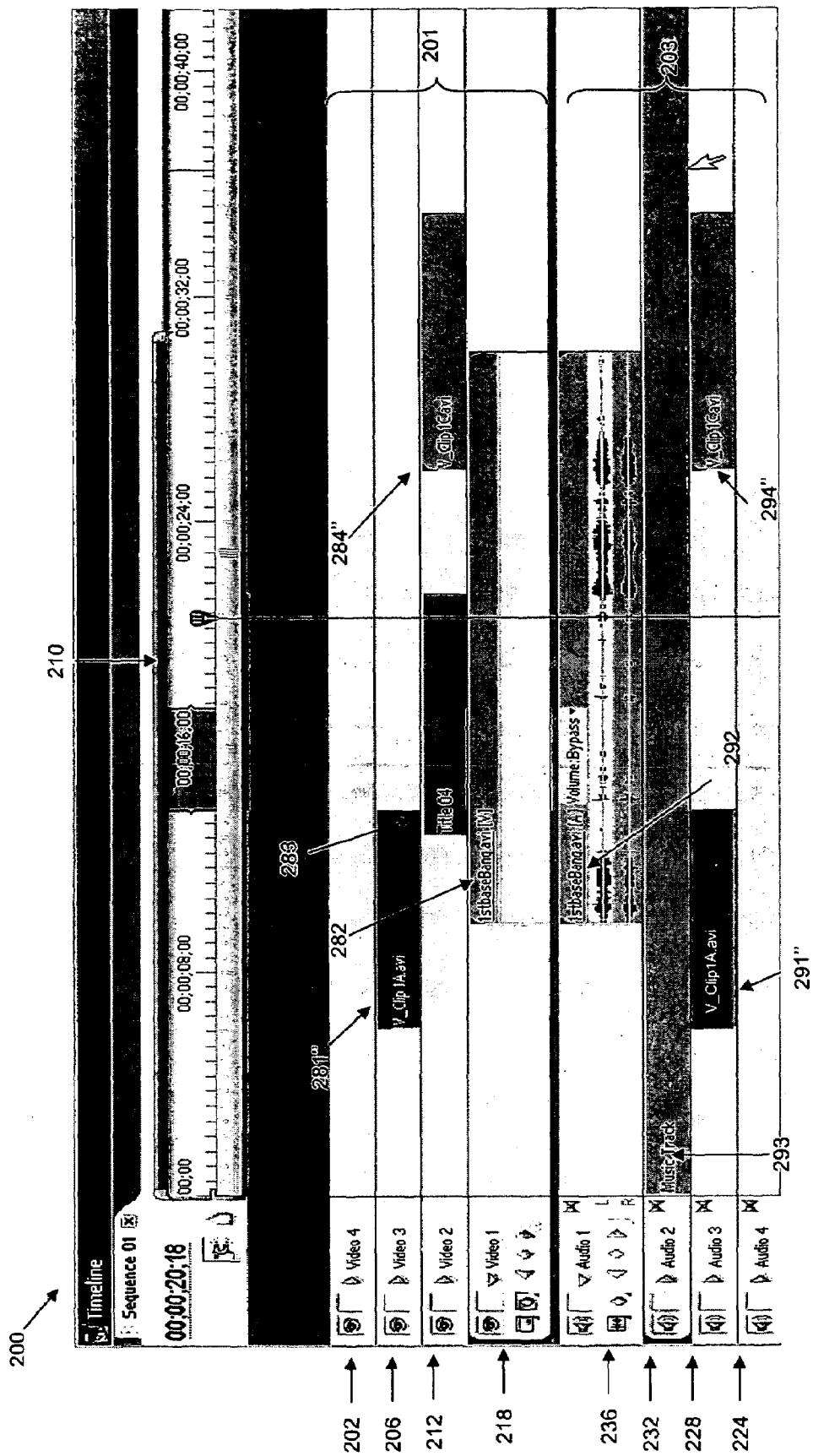

In FIG. 2C, after the selector is used to lock audio clip 291" into Audio 3 Track 228, the selector can cross over from the audio track area 203 to the video track area 201 to move the video clip 281" to another track, Video 3 Track 206. The user can then deselect the video clip 281" to drop the video clip 281" into Video 3 Track 206, and the audio clip 291" is dropped into Audio 3 Track 228. The video clip 284" and the linked audio clip 294" can be moved with the same drag-and-drop procedure.

Figure 2D:
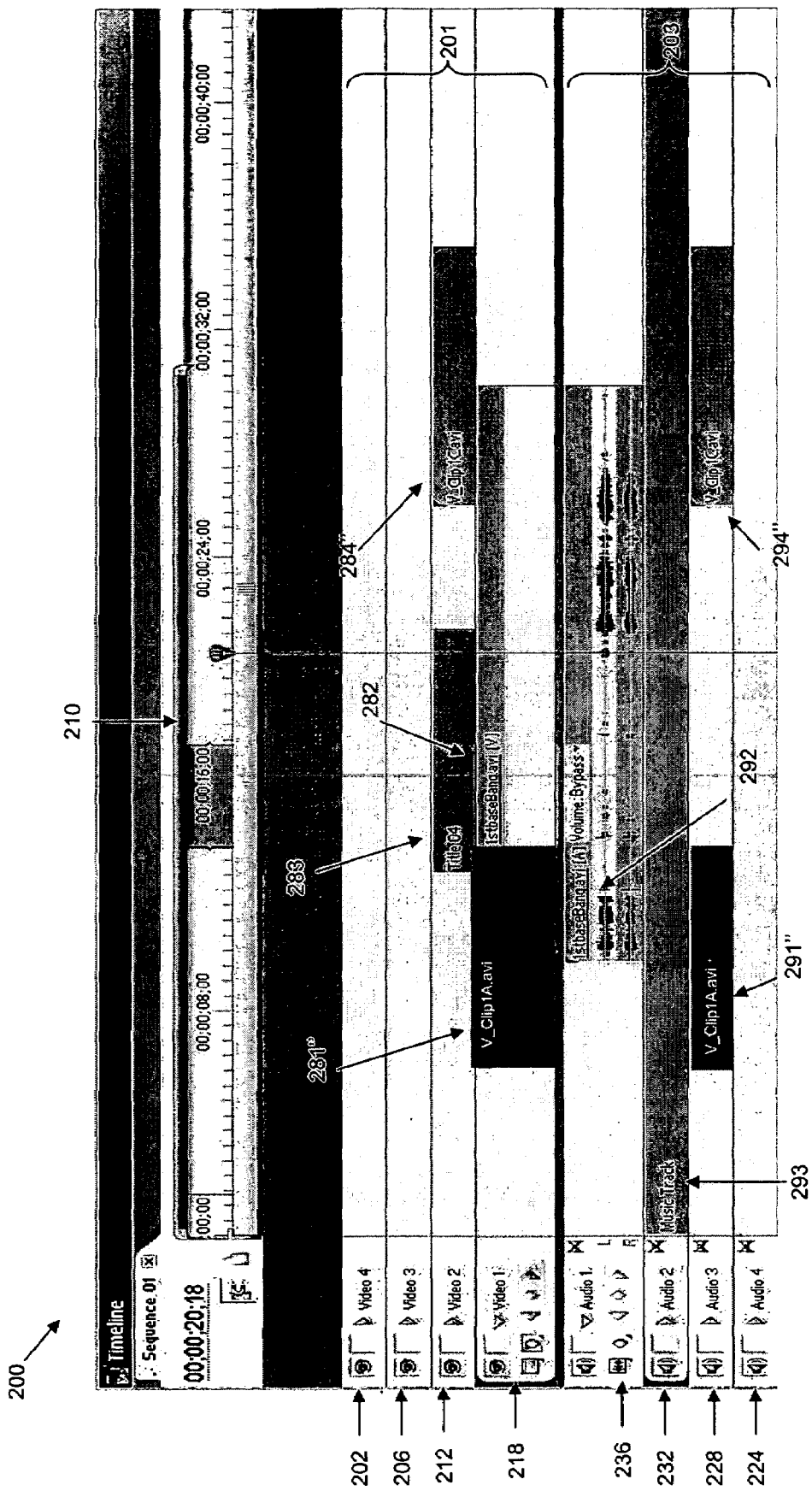

FIG. 2D shows a variation of FIG. 2C where after the selector is used to lock audio clip 291" into Audio 3 Track 228, the selector can cross over from the audio track area 203 to the video track area 201 and keep the video clip 281" in the same track, Video 1 Track 218. The user can then deselect the video clip 281" to drop the video clip 281" into Video 1 Track 218, and the linked audio clip 291" is dropped into Audio 3 Track 228, a non-matching track.

In some embodiments, when a clip is placed on top of another clip in the same track, such as video clip 281" being placed on part of video clip 282 in FIG. 2D, the clip that is placed on top overwrites the portion of the clip that is underneath. In FIG. 2D, for example, video clip 281" overwrites a portion of video clip 282, and an edit point (i.e., a cut) is located at the end point of video clip 281". In other embodiments, when a clip is not placed on another clip in the same track, such as video clip 281" in Video 3 Track 206 in FIG. 2C, the clip can mix with the audio or video during playback. For example, video clip 281" in FIG. 2C can mix with video clip 282 and the Title overlay 283 during play back of the video. In other embodiments, a clip can be placed on an existing clip in a track to cause an overwrite, while the linked clip can be on a non-matching track to allow mixing. For example, in FIG. 2D, video clip 281" overwrites part of video clip 282 in Video 1 Track 218, while audio clip 291 in Audio Track 3 mixes with audio clip 292 in Audio 1 Track 236 and with Music soundtrack 293 in Audio 2 Track 232.

Figure 3:
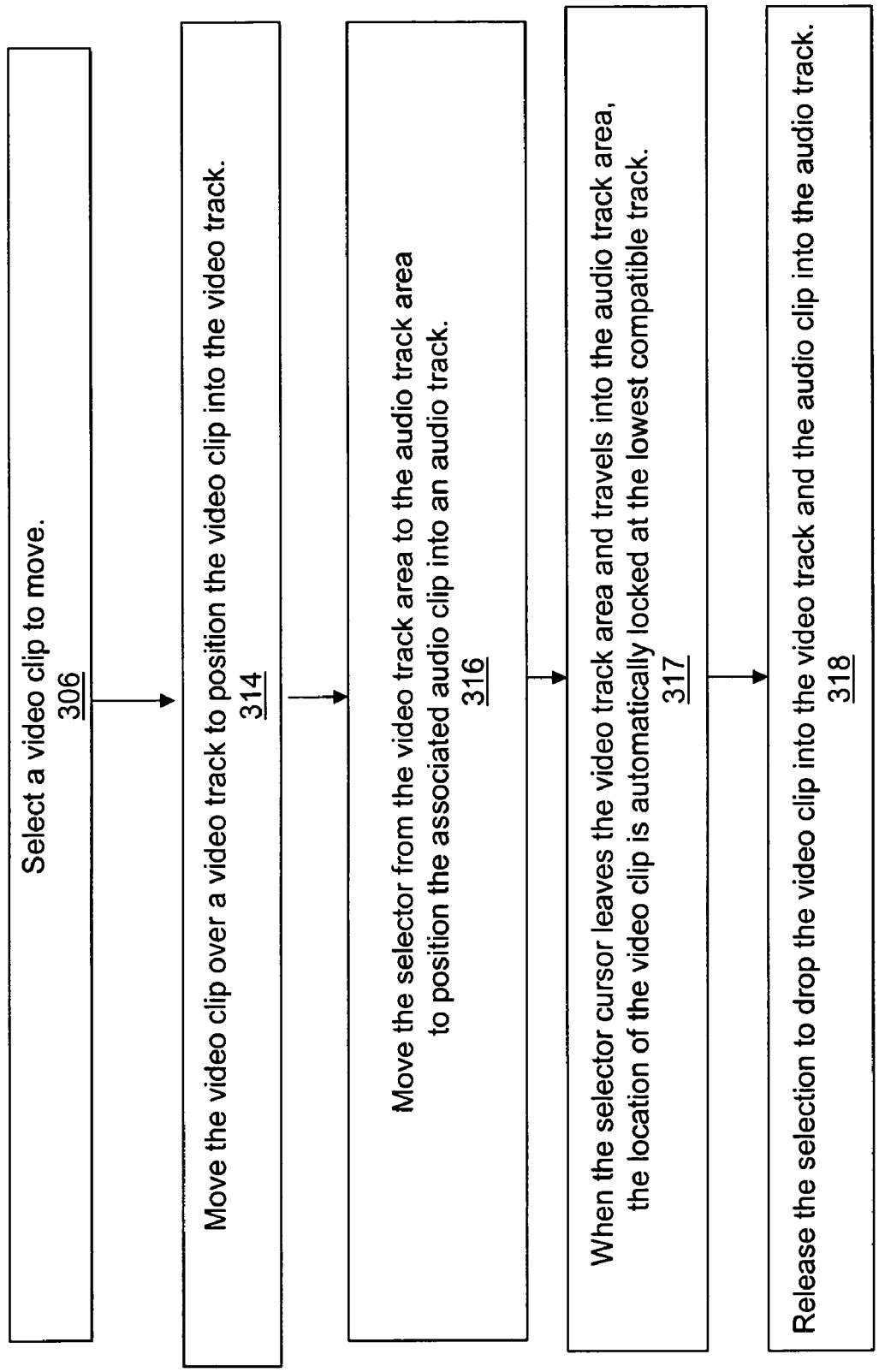
FIG. 3 is a flowchart showing example video and audio clip editing techniques.

FIG. 3 shows a flowchart for the linked audio and video clip drag and drop technique. A video clip is selected 306 for positioning on a video track, and the video clip is moved 314 to the desired video track. An onscreen cursor can be used to show the location of the movements of the clips in the panel. The video clip is moved 314 to a video track to position the video clip into the video track. Then, the selector can be moved 316 from the video track area to the audio track area to position the audio clip onto an audio track. In some embodiments, when the selector cursor leaves the video track area and travels into the audio track area, the location of the video clip is automatically locked at the lowest compatible track, e.g., the video clip will be locked at video track 1, which is the lowest compatible video track at 317. When the selector is released or the selector is unselected at 318, then the audio clip is dropped into the audio track, and the video clip is dropped into the video track.

If the audio clip is dropped on top of another audio clip in the same track, or the video clip is dropped on top of another video clip in the same track, then an overwrite can occur where the clips overlap in the track. In some embodiments, the video clip can be dropped into the video track before the audio clip is dropped into the audio track, or the audio clip can be dropped into the audio track before the video clip is dropped into the video track. Other embodiments for the drag-and-drop techniques of FIG. 3 can first select the audio clip before the video clip. For example, the flowchart of FIG.

3 can have the audio clip selected in 306, positioned over a desired audio track in 314, and the cursor can be moved to the video track area to position a video track in 316 and lock the audio clip to the lowest compatible track at 317 before dropping the linked video and audio clips into their desired tracks in 318. In some embodiments, regardless of the order of dropping or clip selection, the audio and video clips remain linked and synchronized through the drag-and-drop procedure.

Figure 4:
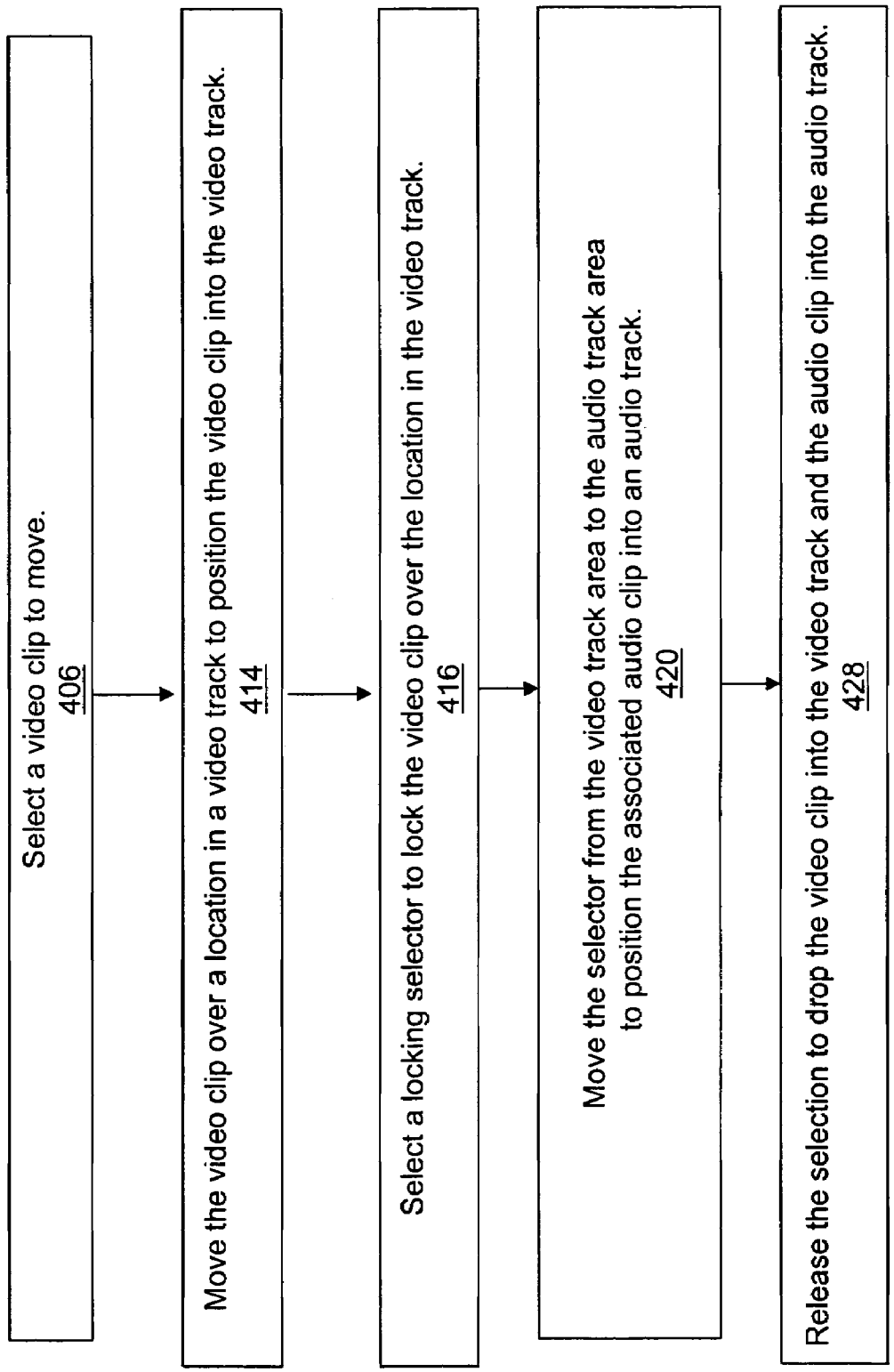
FIG. 4 is a flowchart showing example video and audio clip editing techniques.

FIG. 4 shows another embodiment for a flowchart for the linked audio and video clip drag-and-drop technique. A video clip is selected 406 for positioning on a video track, and the video clip is moved 414 to that position on a desired video track. The video clip is then locked 416 at the designated position on the selected video track. The locking of the clip onto the track can occur in several ways. For example, in some embodiments, a locking key can be selected when the clip is positioned over the desired location in a track to lock the clip at the desired position on the track. The locking key, for example, may be a selection with a pointing device, a key on a keyboard, and the like. Then, the cursor can be moved 420 from the video track area to the audio track area to position the audio clip onto an audio track. When the selector is released 428, then the audio clip is dropped into the audio track, and the video clip is dropped into the desired video track.

In other embodiments, the video clip is locked and dropped into the desired position in the track when the locking key is selected, and the cursor can still move to the audio track area to move the linked audio clip to a desired audio track. In some embodiments in the drag-and-drop technique, the video clip can be locked to a desired video track, and the audio clip can be locked to a desired audio track. For example, when the selector cursor is moved to the audio track area after the video clip is locked on a video track, a user can select the locking key a second time in the drag-and-drop sequence to lock the audio clip onto a desired audio track. In these embodiments, when the locking key is unselected the linked audio clip can then be dropped into the desired audio track and the linked video clip can be dropped into the desired video track.

In some embodiments, "embedded" timeline sequences can operate like the linked audio and video clips for the drag-and-drop techniques described above for FIGS. 1A-4. FIGS. 5-9 show examples of embedded timeline sequences and of how an embedded audio sequence and an embedded video sequence can have drag-and-drop capabilities similar to the audio clip and the video clip, respectively. FIGS. 5-9 also show examples of embedded timeline sequences for multiple-camera monitors.

In some embodiments, a user of a software program can assemble various clips into one or more tracks of video and audio corresponding to the video. All or portions of any of the multiple tracks can be used to generate a first (source) timeline sequence of video or audio. All or portions of the source timeline sequence can be inserted into at least one track of a second (target) timeline sequence. The insertion of the source timeline sequence into a track of the target timeline sequence can be referred to as "embedding" or "nesting" the source timeline sequence into the target timeline sequence. The target timeline sequence can be generated from all or portions of any of the multiple, target tracks.

In some embodiments, the embedding/nesting can refer to inserting and including the source timeline sequence into a target track of the target timeline sequence. In other embodiments, the embedding/nesting can refer to pointing, mapping, linking, or referring to the source timeline sequence from the target track of the target timeline sequence. In other words, the target track of the target timeline sequence can point to or refer to the source timeline sequence, instead of having the audio/video footage of the source timeline sequence inserted within the target track of the target timeline sequence.

In some embodiments, the target timeline sequence can be edited, allowing for insertion or removal of all or portions of multiple-camera video and/or audio tracks, including the source timeline sequence, and/or video and audio tracks and clips within the source timeline sequence, any references of or pointers to the timeline sequences or tracks, or any editing combination thereof. The software can provide a display of each of the multiple-camera tracks from the source timeline sequence and allow those tracks and/or video clips within those tracks to be added or deleted.

When edits are made to the source timeline sequence, the target timeline sequence can automatically be updated with the changes. The changes can be displayed in a multiple-camera monitor. Each monitor can refer to a separate window or screen on a user's display panel, each monitor can display one of the video tracks, and each video track can correspond to video footage from a distinct camera in the multiple-camera system. Additional monitors can be used for displaying the source and target timeline sequences. For example, monitors can be used to present audio/video in the assembly or edits of multiple audio/video clips into the audio/video tracks of the source timeline sequence, and monitors can be used to present audio/video in the generation or edits of the source and target timeline sequences.

The software program can include a multiple-camera monitor, in which each track can be shown in a separate monitor. Each track can include audio and video clips corresponding to footage from one of the cameras. The multiple-camera monitor can display monitors for simultaneous video tracks and can include a monitor displaying a selected track that is designated to play from the source timeline sequence. In some embodiments, the multiple-camera monitor can display a number of separate streams of video, in which each stream of video can correspond to a track and can be shown in a separate monitor or portion of a monitor. There can be an output monitor or a preview monitor to present audio/video in the source timeline sequence or the target timeline sequence. In other embodiments, any of the multiple-camera monitors can be used to facilitate editing. The software program can include a controller to control monitor selection and editing of any of the tracks and timeline sequences.

A software user can select one of the video tracks to be the selected track as part of the source timeline sequence. As compared with traditional multiple-camera editing, the instant disclosure provides techniques by which multiple audio or video clips can be included in each track. In other words, there need not be a limit of having only one clip per track after combining clips from multiple camera source footage. A video/audio track can be selected and inserted into, removed from, or referenced from the timeline sequence without destroying or modifying the video/audio clips within the video/audio track. Since the clips and/or the tracks themselves need not be altered, deleted, or modified, those clips and/or tracks can be retrieved later in their entirety for subsequent editing into the timeline sequence. After the edits have been made to the source timeline sequence, the tracks, the clips, or any of their combinations, within the source timeline sequence, the target timeline sequence can be automatically updated to include the changes of the source timeline sequence. The changes to the contents of the source or target timeline sequences can automatically be shown in a window or monitor. When video tracks are created by assembling the video clips, the software program can automatically generate corresponding audio tracks if corresponding audio is available for the video clip. Also, when the source and target timeline sequences are created or edited, the software program can automatically generate and update source and target audio timeline sequences to correspond to the source and target video timeline sequences.

The target timeline sequence can include video and audio from multiple, embedded, source timeline sequences. All or portions of the source timeline sequences can be included in the target timeline sequence. Multiple video tracks can be synchronized at a point in the timeline or during an event. So when synchronized, there can be multiple cameras displaying the same event in the multiple-camera monitor at the same time. The synchronization can be performed automatically by the software, manually by the user of the software, by a similar time length of the tracks, by a similar recording time of the video footage of the tracks, or by an audio or video marker or cue. The audio can follow the video. Alternatively, the audio can be inserted into or deleted from any of the tracks and timeline sequences. Multiple-camera monitors can simultaneously display multiple camera angles playing in a source and/or target timeline sequence.

Figure 5:
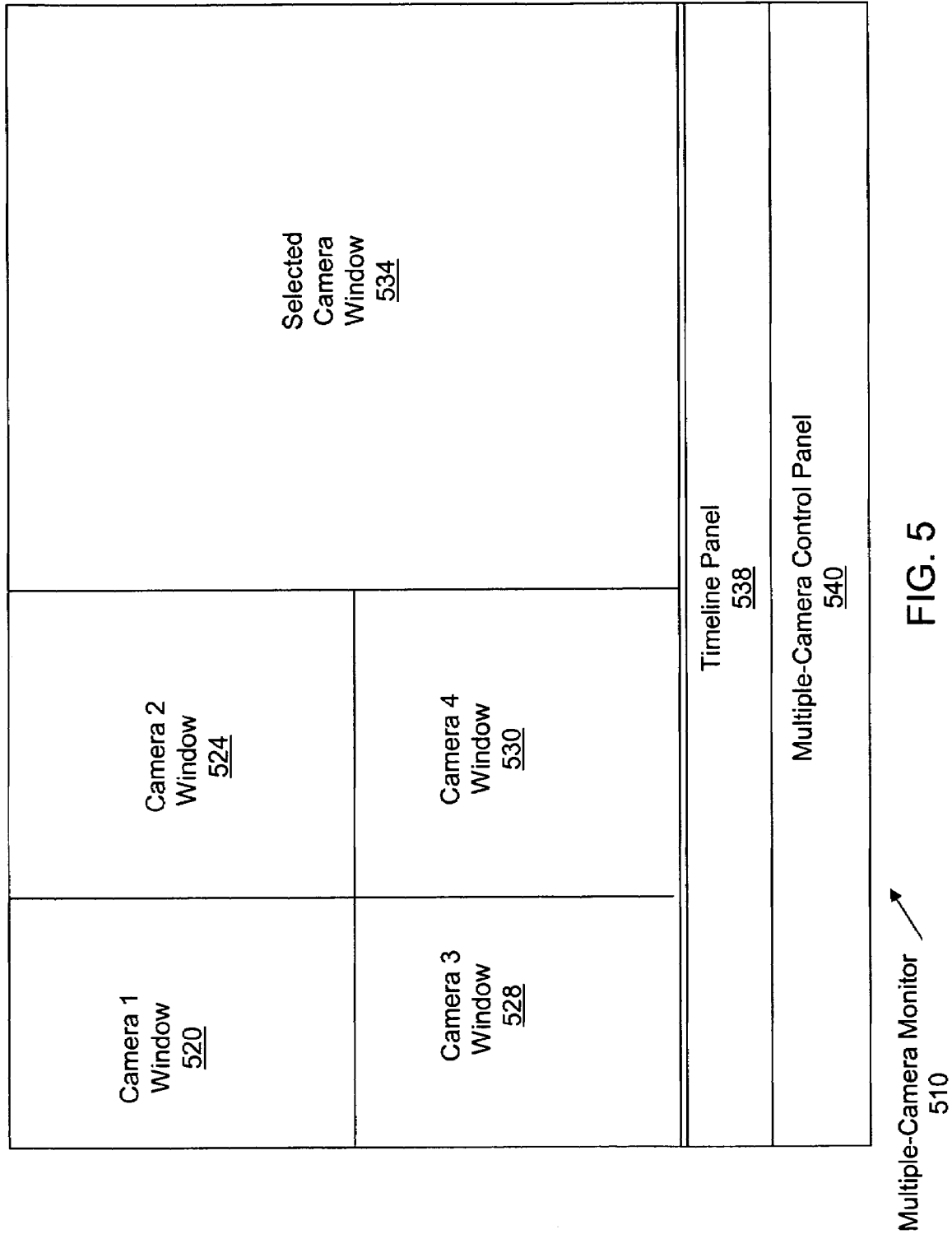
FIG. 5 shows an example of a multiple-camera monitor.

As shown in FIG. 5, an example multiple-camera monitor 510 can display video footage from four different cameras. The multiple-camera monitor 510 can be shown in a panel or window in a display, and can be used to create a timeline sequence. Creating the timeline sequence can involve editing, such as inserting or removing, all or portions of video tracks from the timeline sequence at different time locations in the timeline sequence. In this aspect, the timeline sequence can include various portions of video clips from one or more selected video tracks.

Camera 1 Window 520 shows footage from a first camera, Camera 2 Window 524 shows footage from a second camera, Camera 3 Window 528 shows footage from a third camera, and Camera 4 Window 530 shows footage from a fourth camera. Each of the camera windows shows footage from a distinct track of video. Each track of video may also include other types of still images, frames, and moving images, such as B-roll and stock footage. The multiple-camera monitor can facilitate the creation of a track of video by allowing a software program user to insert and delete video clips from a track, in which the track and corresponding changes to the track can be displayed in a window of the multiple-camera monitor 510. Also, each track of video may have a corresponding track of audio. The timeline panel 538 can display a total duration of video footage and present time locations for the video footage for one or more of the tracks. The timeline panel can also include time markers for one or more of the tracks, as well as the overall created timeline sequence. In some embodiments, the time markers can be used to facilitate synchronizing the tracks and can be used in creating and editing the timeline sequence. The number of windows and corresponding tracks are not limited to the number shown in FIG. 5 but may be of a greater or lesser number.

The multiple-camera monitor 510 can simulate live camera switching and can facilitate editing of video footage in real-time. In some embodiments, the multiple-camera monitor 510 can show four video tracks simultaneously. A user of the multiple-camera monitor 510 can use a multiple-camera control panel 540 to switch between video from the camera windows 520, 524, 528, 530 to show a selected camera window 534. The selected-camera window 534 shows which one of the camera windows is currently actively playing in a timeline sequence. The selected-camera window 534 can also be used for previewing edits into the timeline sequence. The locations of the windows 520, 524, 528, 530, and 534 are not limited to the locations shown in FIG. 5, but may be in various locations in the multiple-camera monitor 510.

In some embodiments, the windows 520, 524, 528, 530, and 534 can be moved to other locations within the multiple-camera monitor 510. In other embodiments, the windows 520, 524, 528, 530, and 534 can be detached from the multiple-camera monitor 510, and the detached window can be presented in a stand-alone window (not shown). The timeline sequence can be edited with drag-and-drop functionality using any of the windows 520, 524, 528, and 530. In some embodiments, the multiple-camera control panel 540 can include controls for editing the tracks, as well as the video and audio clips within those tracks. A software controller can control editing of the video footage in any of the video tracks and timeline sequences. The multiple-camera control panel 540 can include selectors for cutting and pasting video and audio clips and/or tracks in the timeline sequence. Other selectors may include, but are not limited to, controls for volume, playing, pausing, stopping, fast-forwarding, rewinding, recording, shuffling, searching, repeating, multi-channel equalizing, playlists, deleting, sorting, randomizing, cropping, selecting, saving, importing, exporting, hiding and unhiding windows, and adjusting brightness, contrast, color, and window size and position.

The tracks can be synchronized to facilitate editing and creating the timeline sequence. In some embodiments, the tracks can be synchronized according to when a clip begins or ends in one or more tracks. In other embodiments, the tracks can be synchronized according to a time of the tracks or clips (e.g., common footage recorded at a time of day in hours, minutes, and seconds), a time marker in the tracks or clips (e.g., a footage duration marker in hours, minutes, and/or seconds), or a cue in the tracks or clips, (e.g., a flash or clapper, or audio/visual cues from the footage). The tracks can be manually synchronized by a software user, or can be synchronized automatically with the software program.

Figure 6:
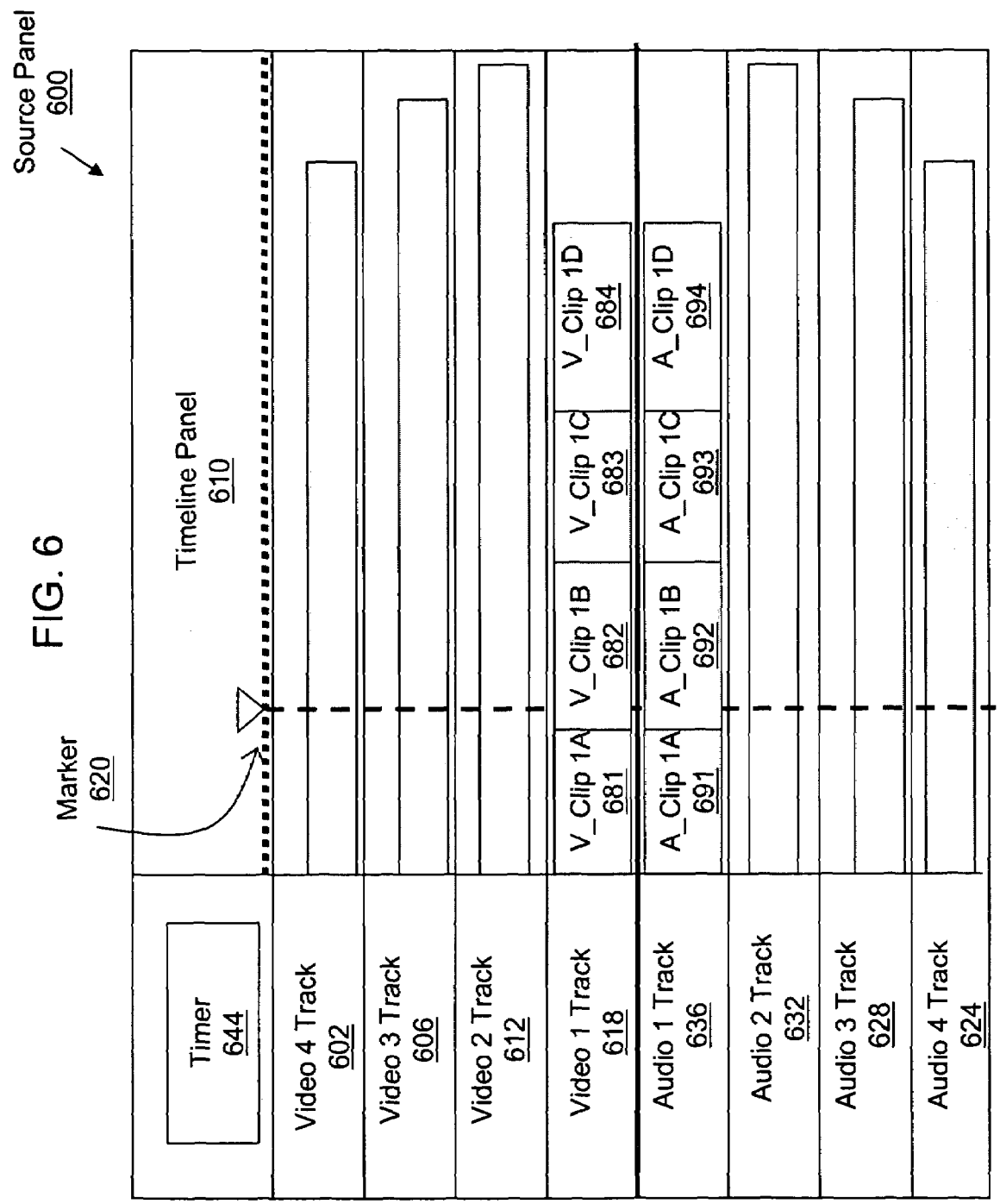
FIG. 6 shows an example of a source timeline sequence.

FIG. 6 shows an example source panel 600 for a source timeline sequence. The source panel 600 may be displayed along with the multiple-camera monitor 610, and can be used in creating the source timeline sequence. The source panel 600 shown in FIG. 6 has four video tracks, Video 1 Track 618, Video 2 Track 612, Video 3 Track 606, and Video 4 Track 602, and four audio tracks, Audio 1 Track 636, Audio 2 Track 632, Audio 3 Track 628, and Audio 4 Track 624. The source panel 600 is not limited to the number of audio and video tracks shown, but may include any number of tracks. The video tracks 602, 606, 612, and 618 may or may not have corresponding audio tracks 624, 628, 632, and 636. The video tracks 602, 606, 612, and 618 can be rearranged in the source panel 600, and/or moved into or out of the source panel 600 via a selector control or with a drag-and-drop feature.

In the embodiment of FIG. 6, the timeline panel 610 shows a time duration of the tracks. The timeline panel 610 may have features to allow zooming into and out of a time duration. The timeline panel 610 may also have one or more markers, such as marker 620, to facilitate editing and synchronizing. A timer 644 may show one or more time-related features, such as a time duration of the tracks or source sequence, a time of day, or an amount of time the source sequence has been edited.

The multiple-camera control panel 540 of FIG. 5 can be used to control the video tracks and can be used to toggle the multiple-camera monitor between a record mode, to enable multiple-camera editing, and out of the record mode to disable multiple-camera editing. In one embodiment, the record mode records edits made during playback of the timeline sequence. When not in a record mode, there can be playback of the timeline sequence, including any existing edits in the timeline sequence. In another embodiment, the record mode also records while the timeline sequence is being created from the footage in the tracks.

In traditional digital or software-based multiple-camera editing, multiple source video clips are selected in a bin, before the clips have been assembled into a timeline sequence, and the clips are then packaged into a single, multiple-camera clip. The single, multiple-camera clip can then be added to an existing video sequence. In traditional multiple-camera editing, only one audio or video clip may be contained on each track. So, each audio or video clip that is selected is placed on a separate track. Also, after the single, multiple-camera clip has been created, the source audio and/or video that created the single, multiple-camera clip cannot be edited. If the multiple-camera clip needs to be modified, then the multiple-camera clip is recreated from the source footage in the traditional approach.

In an advantage over traditional multiple-camera editing, the instant disclosure provides techniques in which multiple audio or video clips may be included in each source or target track (e.g., FIG. 6 shows audio clips 691, 692, 693, 694 in Audio 1 Track 636, and video clips 681, 682, 683, 684 in Video 1 Track 618). In other words, there is no limit of only one clip per track. In another advantage over traditional multiple-camera editing, a video/audio track can be selected and inserted into, removed from, or referenced from the timeline sequence without destroying or modifying the video/audio clips within the video/audio track. Since the clips and/or the tracks themselves are unaltered and not deleted or modified, those clips and/or tracks can be retrieved later in their entirety for subsequent editing into the timeline sequence. The instant disclosure reveals techniques that allow for more than one video clip to be assembled on each track, and each track can be fully-editable at any time.

Figure 7:
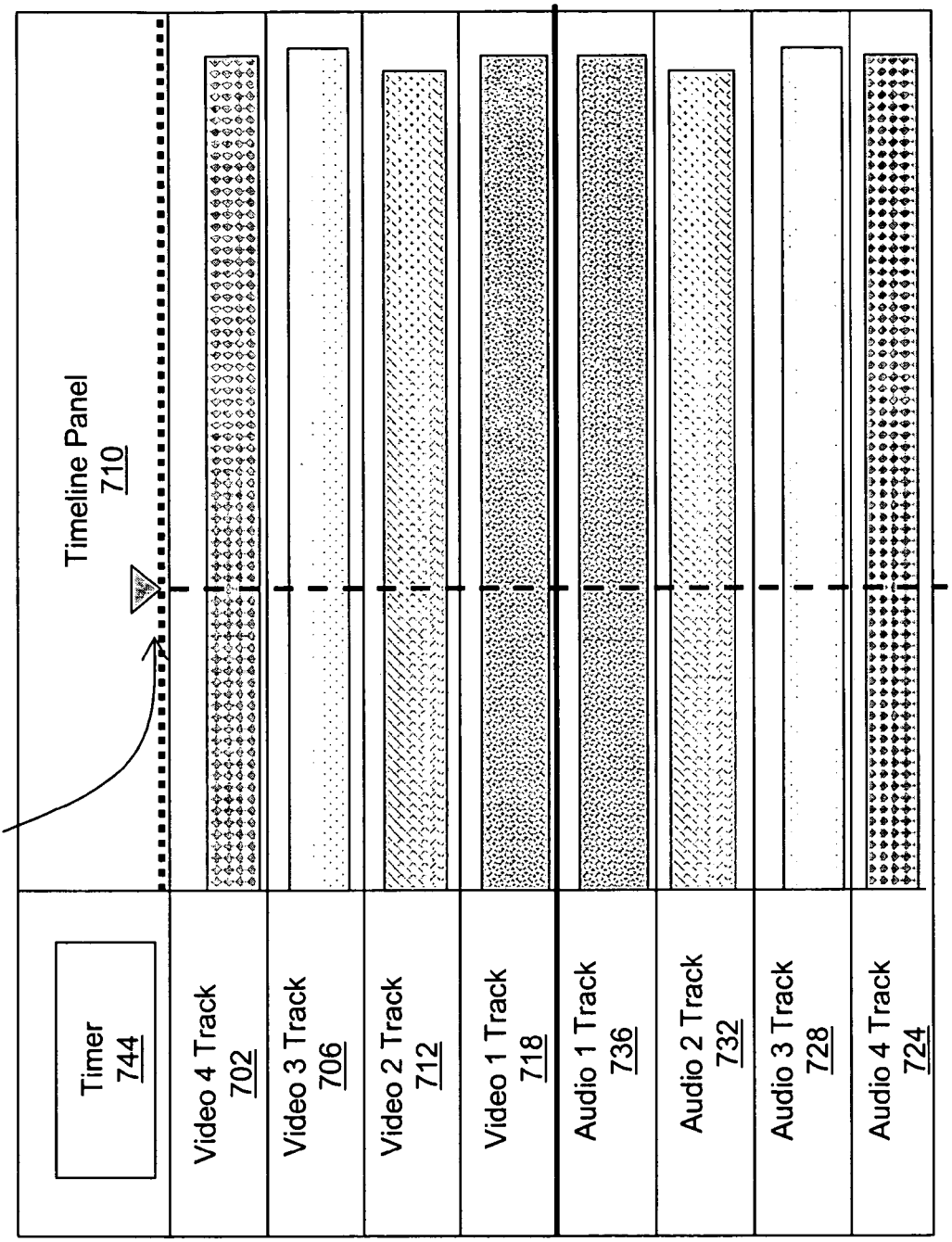
FIG. 7 shows an example of a target timeline sequence.

FIG. 7 shows a target panel 700 for a target timeline sequence. The target panel 700 can be displayed along with the multiple-camera monitor 510 and/or the source panel 600, and can be used in creating the target timeline sequence. The target panel 700 shown in FIG. 7 has four video tracks, Video 1 Track 718, Video 2 Track 712, Video 3 Track 706, and Video 4 Track 702, and four audio tracks, Audio 1 Track 736, Audio 2 Track 732, Audio 3 Track 728, and Audio 4 Track 724. The target panel 700 is not limited to the number of audio and video tracks shown, but may include any number of tracks. The video tracks 702, 706, 712, 718 may or may not have corresponding audio tracks 724, 728, 732, 736. The video tracks 702, 706, 712, 718 can be rearranged in the target panel 700, and/or moved into or out of the target panel 700 via a selector control and/or with a drag-and-drop feature. Each of the tracks 702, 706, 712, 718, 724, 728, 732, 736 shown in FIG. 7 can include a source timeline sequence, such as the source timeline sequence generated from FIG. 6.

The timeline panel 710 can include a time duration of the tracks. The timeline panel 710 can include features to allow zooming into and out of a time duration (e.g., from minutes to seconds to fractions of a second). The timeline panel 710 can also have one or more markers, such as marker 720, to facilitate editing and synchronizing. A timer 744 can show one or more timer features, such as the time duration of the tracks, source sequence, time of day, or an amount of time the source timeline sequence has been edited.

The multiple-camera control panel 540 of FIG. 5 can be used to control the video tracks and can be used to toggle the multiple-camera monitor into a record mode to enable multiple-camera editing. In some embodiments, the record mode records edits made during playback of the target timeline sequence. In other embodiments, the record mode also records while the timeline sequence is being created from the footage in the tracks. Unlike the tracks shown in the source panel 600 of FIG. 6, any number of the tracks shown in the target panel 700 of FIG. 7 can include a source timeline sequence.

Figure 8:
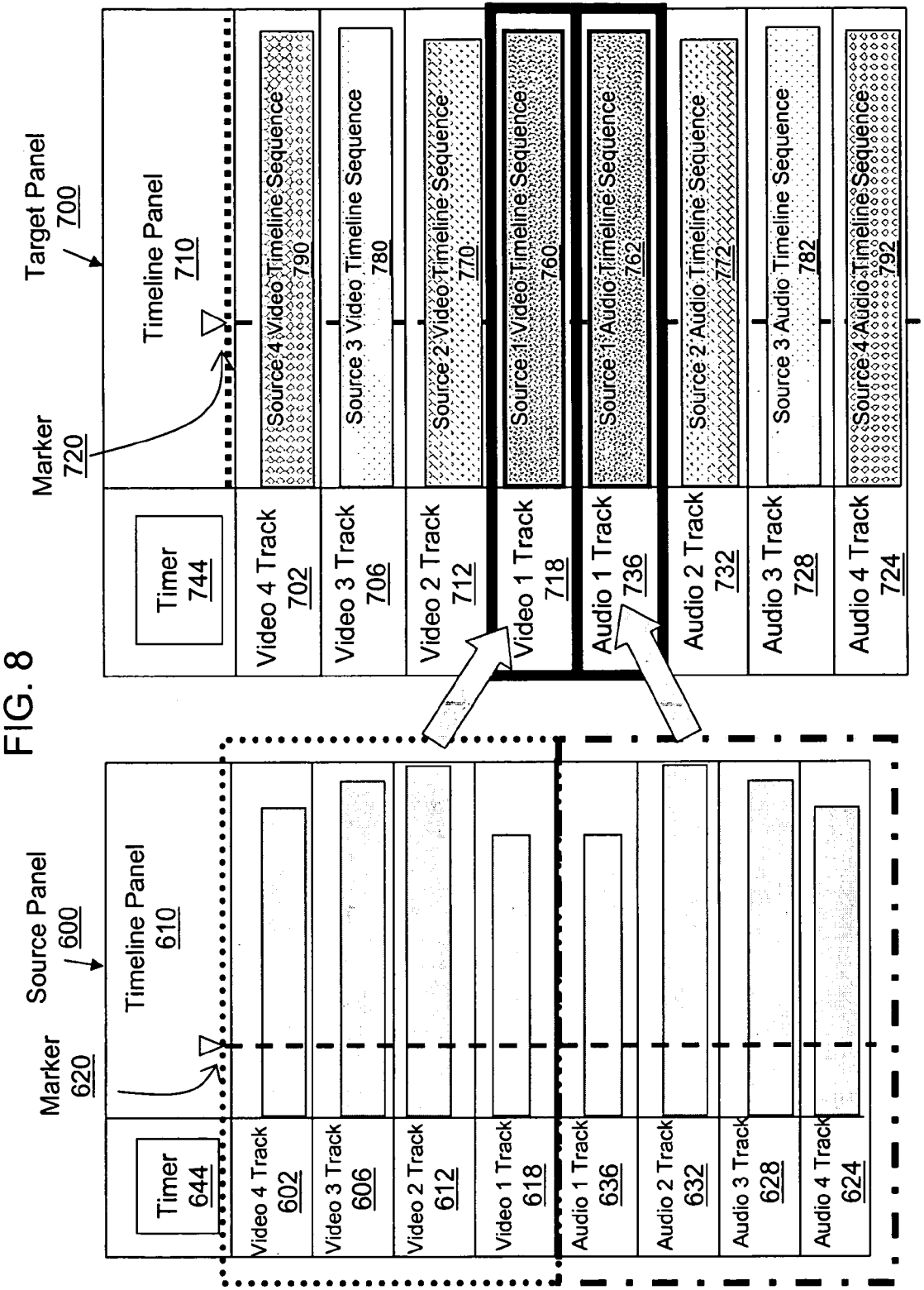
FIG. 8 shows an example of embedding the source timeline sequence into the target timeline sequence.

FIG. 8 shows embedding the source timeline sequence into the target timeline sequence. In some embodiments, the embedding/nesting can refer to inserting and including at least some audio/video portions of the source timeline sequence into a target track of the target timeline sequence. In other embodiments, the embedding/nesting can refer to pointing, mapping, linking, or referring to at least some audio/video portions of the source timeline sequence from a target track of the target timeline sequence. A user of a software program can assemble source footage into various clips (e.g., video clips 681, 682, 683, and 684), which are inserted into the tracks of video and audio in the source panel 600. A first timeline sequence or source timeline sequence can be created from all or portions of any of the multiple source tracks. The source timeline sequences 760, 762 can be inserted into or referred to at least one track (e.g., 718, 736) of the target panel 700. For example, a user may select and drag a window or monitor showing the source timeline sequence or another visual representation of the source timeline sequence in the source panel 600 into a track representation of the target panel 700, such as a monitor/window showing the track. The second or target timeline sequence is created from the editing of the tracks (e.g., 702, 706, 712, 718, 736, 732, 728, and 724) in the target panel 700. The target timeline sequence may include all or portions of any of the tracks in the target timeline sequence, including any combinations of all or portions of any of the target tracks or references.

The target timeline sequence can be edited, allowing for insertion or removal of the multiple-camera video and/or audio, including the source timeline sequence 760, 762, the tracks 702, 706, 712, 718, 736, 732, 728, and 724 and/or video clips within any of the source timeline sequences, or any editing combination thereof. The software can provide a display of the multiple-camera tracks from source timeline sequence and allow those tracks and/or video clips within those tracks to be added, deleted, or modified. After the source timeline sequence 760, 762 has been edited, the target timeline sequence can automatically include the updated changes since the content of the target timeline sequence can include edits from portions or all of the source timeline sequence. The changes can be displayed in a multiple-camera monitor 510, as shown in FIG. 5. Each monitor can refer to a separate window or screen on a user's display panel, and each monitor can display one of the video tracks. In some embodiments, the multiple-camera monitor 510 can include a monitor for any of the tracks 602, 606, 612, 618, 636, 632, 628, 624, 702, 706, 712, 718, 736, 732, 728, and 724 in the target panel 700 and the source panel 600. The multiple-camera monitor 510 can display video from any or all of the tracks simultaneously. Users of the software program can conduct multiple-camera edits by switching between the various monitors.

In another embodiment, the tracks 702, 706, 712, 71.8, 736, 732, 728, and 724 in the target panel 700 include a mixture of source video timeline sequences and video clips not within a source video timeline sequence. For example, Video 1 Track 718 and Video 2 Track 712 may be source video timeline sequences, and Video 3 Track 706 and Video 4 Track 702 may include one or more video clips, but not a source video timeline sequence.

Figure 9:
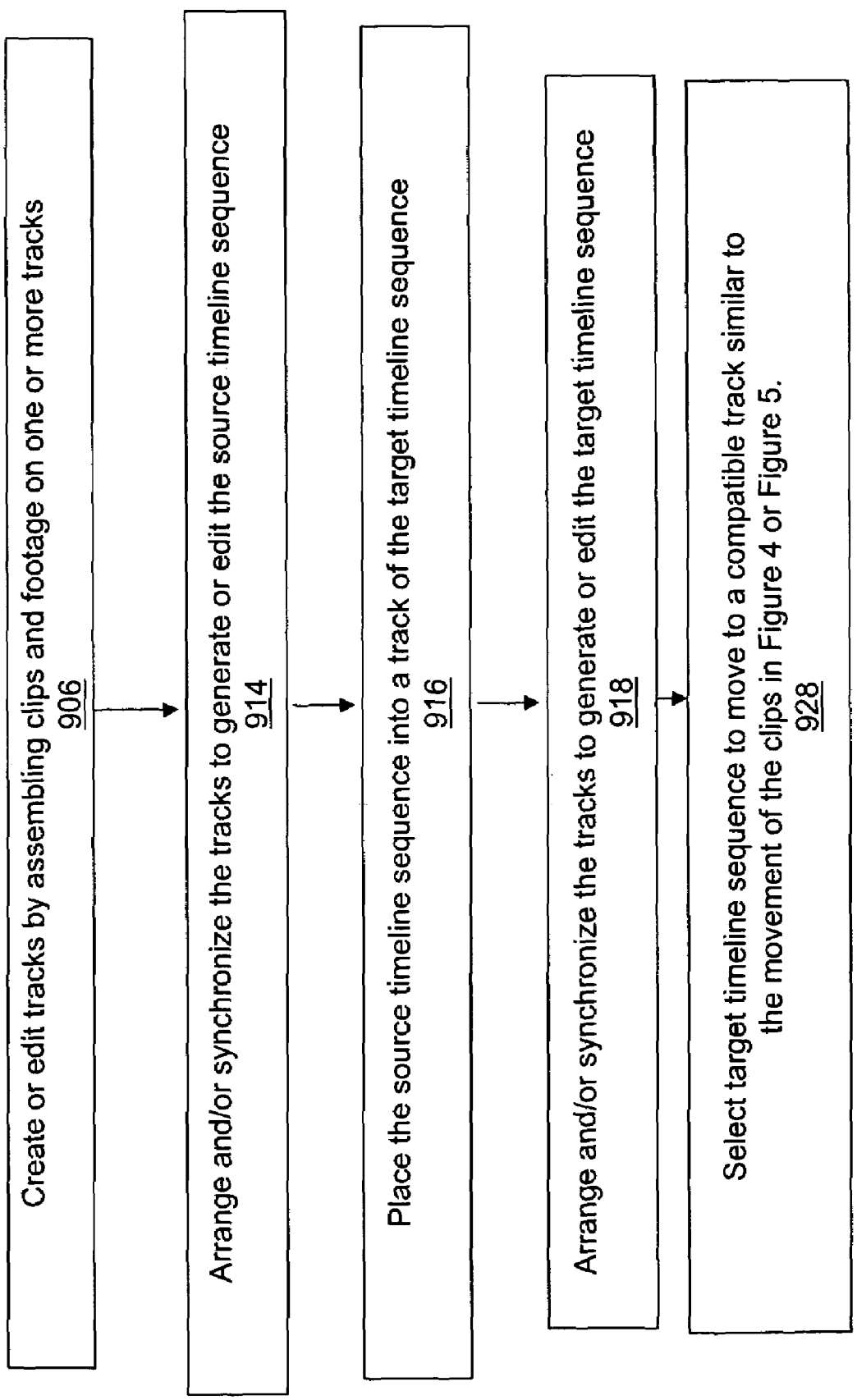
FIG. 9 is a flowchart showing an example of the use of embedding timeline sequences with audio and video clip editing techniques.

FIG. 9 shows an example flowchart for generating a target timeline sequence. One or more tracks can be created at 906 from assembling one or more video clips on each track. Alternatively, if the tracks already exist, the tracks can be edited at 906, for example, by adding or removing footage and clips from any of the tracks. A source timeline sequence can be generated at 914 from the arrangement and synchronization of the tracks. Alternatively, if the source timeline sequence already exists, the source timeline sequence can be edited at 914. In generating or editing the source timeline sequence, all or portions of any of the tracks can be added to or removed from the source timeline sequence in any combination.

The source timeline sequence is then embedded/nested into a track of the target timeline sequence at 916. If the target timeline sequence has more than one track, then the target timeline sequence that is generated can have video clips and footage from any of the tracks associated with the target timeline sequence. For example, the target timeline sequence can include portions or all of the source timeline sequence generated or edited at 914, as well as other source timeline sequences and tracks with one or more video clips. Each track may also have other types of still images, frames, and moving images, such as B-roll and stock footage. If the target timeline sequence has tracks other than the source timeline sequence, then those other tracks can be edited within the target timeline sequence as well.

A target timeline sequence can be generated at 918 from the arrangement and synchronization of the tracks associated with the target. Alternatively, if the target timeline sequence already exists, the target timeline sequence can be edited at 918. In generating or editing the target timeline sequence, all or portions of any of the tracks can be added to or removed from the target timeline sequence.

After the target timeline sequence has been generated at 918, the target timeline sequence can be dragged and dropped at 928 similar to drag-and-drop technique for clips in FIGS. 1A-4. For example, a target video timeline sequence can have a linked target audio timeline sequence, and a source video timeline sequence can have a linked source audio timeline sequence. The linked audio/video timeline sequences can be dragged and dropped to overwrite or mix with portions of other clips or timeline sequences in the panel.

In some embodiments, the source timeline sequence and any tracks and video clips within the source timeline sequence can be edited, even when the source timeline sequence is embedded within the target timeline sequence. Any edits to the source timeline sequence can be automatically updated in the target timeline sequence. For example, since the source timeline sequence is nested or embedded within the target timeline sequence, any edits and changes to the source timeline sequence may be automatically updated in the track of the target timeline sequence that contains the source timeline sequence. So, if all or portions of the target timeline sequence are included within the generated target timeline sequence, then the target timeline sequence will automatically include any updates from edits to the source timeline sequence. In other embodiments, since the target timeline sequence can include tracks from multiple source timeline sequences, as well as tracks with video clips and footage not generated from a source timeline sequence, any edits made to any of the tracks of the target timeline sequence can be automatically reflected in an updated target timeline sequence.

The software program can enable a user to view any or all of the tracks simultaneously, with each track presented in a separate monitor. To facilitate editing and timeline sequence creation, the source timeline sequence and the target timeline sequence may also be presented in separate monitors.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the disclosure have been described. Other embodiments are within the scope of the following claims. For example, the actions recited in the claims can be performed in a different order and still achieve desirable results. For example, the number of tracks used in the timeline sequences can vary from those shown in FIGS. 1A-2D, 6-8. In some embodiments, if the video tracks or video timeline sequences are edited, the corresponding audio tracks or audio timeline sequences may or may not be edited as well. So if an edit point is created between video clips, then corresponding audio clips can have edit points at the same edit point locations in the track or timeline sequence. The software program can provide a user with an option of whether to include an automatically updated audio arrangement that corresponds with the updated video arrangement. In some embodiments, the audio may automatically follow the video when the video is inserted into or deleted from the timeline sequence. In other embodiments, the audio may not follow the video, but may be inserted into or deleted from any of the tracks and/or timeline sequence. The tracks may have any number of video/audio clips, and the video/audio clips may be arranged in any order in the tracks. In some embodiments, the embedded timeline sequences are not associated with multiple-camera footage. In some embodiments, the order of the drag-and-drop process may vary from the process shown. In other embodiments, the audio and video clips can be positioned on any track in the timeline sequence, regardless of whether the clip is compatible or incompatible with the track. In these embodiments, the linked clips can be dragged in the timeline sequence, and either the video clip or the audio clip can be locked to a position on any desired track in the timeline sequence with the selector. After one of the linked clips is locked to the position on the desired track, the other clip can be positioned onto any other track in the timeline sequence before the linked clips are deselected and dropped into the timeline sequence.

What is claimed is:

1. A computer program product, encoded on a computer-readable medium, operable to cause data processing apparatus to perform operations comprising:
    in response to selection of a first clip in a first track, moving the selected first clip in a timeline sequence, wherein the timeline sequence comprises a plurality of matched audio and video tracks configured to serve as containers for clips, wherein of the first clip is associated with a second clip; and
    in response to selection of the second clip, moving the selected second clip into a track that is a non-matching track in the timeline sequence, wherein the non-matching track comprises a track that is not associated with a track where the first clip is located,
    wherein the first clip or the second clip comprises embedded timeline sequences,
    wherein the selection of the first clip in the first track comprises a detection of a selector selection,
    wherein, after the selection of the first clip in the first track, the selection of the second clip comprises selecting the second clip when a selector cursor moves to a track compatible with the second clip, wherein audio tracks are compatible with audio clips, and wherein video tracks are compatible with video clips, and
    wherein a position of the first clip is locked in the timeline sequence when the selector cursor is moved to a track that is incompatible with the first clip, wherein the first clip is locked to a lowest compatible track.

2. The computer program product in accordance with claim 1, further comprising:
in response to deselection of either the first or second clips, dropping the first clip into the timeline sequence, and dropping the second clip into the position in the timeline sequence.

3. The computer program product in accordance with claim 2, wherein the dropping of the first clip and the second clip comprises overwriting portions of clips existing in the timeline sequence at locations where the first and second clips are dropped.

4. A system comprising:
a user interface device; and
one or more computers operable to interact with the user interface device and to:
in response to selection of a first clip, drag the first clip in a timeline sequence, wherein the timeline sequence comprises a plurality of matched audio and video tracks, wherein the plurality of matched audio and video tracks in the timeline sequence are configured to serve as containers for clips, wherein the first clip is associated with a second clip;
in response to selection of the second clip, drag the second clip into a non-matching track in the timeline sequence before the first clip is dropped into a first track in the timeline sequence, wherein the non-matching track comprises a track that is not matched with a track at a position of the first clip;
in response to deselection of the first clip or second clip, drop the first clip in the first track and drop the second clip in the non-matching track,
before dropping the first clip in the first tack, detect movement of a selector cursor from tracks compatible with the first clip to tracks incompatible with the first clip, wherein audio tracks are compatible with audio clips, and wherein video tracks are compatible with video clips; and
trigger the selection of the second clip when the selector cursor is detected to have moved to tracks incompatible with the first clip,
wherein the first clip comprises a first video clip, the first track comprises a first video track, the second clip comprises a first audio clip, and wherein the timeline sequence further comprises a second track comprising a first audio track, wherein the matched audio and video tracks comprise the second and first tracks, and wherein the non-matching track comprises a second audio track.

5. The system in accordance with claim 4, wherein the first clip or the second clip comprises embedded timeline sequences.

6. The system in accordance with claim 4, wherein the one or more computers are further operable to:
lock a position of the first clip on a lowest compatible track when the selector cursor is moved to tracks incompatible with the first clip.

7. A system comprising:
a user interface device; and
one or more computers operable to interact with the user interface device and to:
in response to selection of a first clip, drag the first clip in a timeline sequence, wherein the timeline sequence comprises a plurality of matched audio and video tracks, wherein the plurality of matched audio and video tracks in the timeline sequence are configured to serve as containers for clips, wherein the first clip is associated with a second clip;
in response to selection of the second clip, drag the second clip into a non-matching track in the timeline sequence before the first clip is dropped into a first track in the timeline sequence, wherein the non-matching track comprises a track that is not matched with a track at a position of the first clip;
in response to deselection of the first clip or second clip, drop the first clip in the first track and drop the second clip in the non-matching track,
before dropping the first clip in the first track, detect movement of a selector cursor from tracks compatible with the first clip to tracks incompatible with the first clip, wherein audio tracks are compatible with audio clips, and wherein video tracks are compatible with video clips; and
trigger the selection of the second clip when the selector cursor is detected to have moved to tracks incompatible with the first clip,
wherein the first clip comprises a first audio clip, the first track comprises a first audio track, the second clip comprises a first video clip, and wherein the timeline sequence further comprises a second track comprising a first video track, wherein the matched audio and video tracks comprise the first and second tacks, and wherein the non-matching track comprises a second video track.

8. The system in accordance with claim 7, wherein the one or more computers are further operable to:
lock a position of the first clip on a lowest compatible track when the selector cursor is moved to tracks incompatible with the first clip.

9. The system in accordance with claim 7, wherein at least one of the first or second clips comprises embedded timeline sequences.

10. A method for editing video and audio clips comprising:
in response to selection of a first clip, dragging the first clip in a timeline sequence, wherein the timeline sequence comprises a plurality of matched audio and video tracks, wherein the plurality of matched audio and video tracks in the timeline sequence are configured to serve as containers for clips, wherein the first clip is associated with a second clip;
in response to selection of the second clip, dragging the second clip into a non-matching track in the timeline sequence before the first clip is dropped in a first track in the timeline sequence, wherein the non-matching track comprises a track that is not matched with a track at a position of the first clip;
in response to deselection of the first clip or second clip, dropping the first clip in the first track and dropping the second clip in the non-matching track; and
further comprising locking the first clip into a lowest compatible track when the first clip is detected to be dragged to a track that is incompatible with the first clip,
wherein the first clip comprises a first video clip, the first track comprises a first video track, the second clip comprises a first audio clip, and wherein the timeline sequence further comprises a second track comprising a first audio track, wherein the matched audio and video tracks comprise the second and first tracks, and wherein the non-matching track comprises a second audio track.

11. A method comprising:
in response to selection of a first clip in a first track, moving the selected first clip in a timeline sequence, wherein the timeline sequence comprises a plurality of matched audio and video tracks configured to serve as containers for clips, wherein of the first clip is associated with a second clip; and in response to selection of the second clip, moving the selected second clip into a track that is a non-matching track in the timeline sequence, wherein the non-matching track comprises a track that is not associated with a track where the first clip is located, wherein the first clip or the second clip comprises embedded timeline sequences, wherein the selection of the first clip in the first track comprises a detection of a selector selection, wherein, after the selection of the first clip in the first track, the selection of the second clip comprises selecting the second clip when a selector cursor moves to a track compatible with the second clip, wherein audio tracks are compatible with audio clips, and wherein video tracks are compatible with video clips, and wherein a position of the first clip is locked in the timeline sequence when the selector cursor is moved to a track that is incompatible with the first clip, wherein the first clip is locked to a lowest compatible track.

12. A system comprising:

a user interface device; and one or more computers operable to interact with the user interface device and to:

in response to selection of a first clip in a first track, moving the selected first clip in a timeline sequence, wherein the timeline sequence comprises a plurality of matched audio and video tracks configured to serve as containers for clips, wherein of the first clip is associated with a second clip; and in response to selection of the second clip, moving the selected second clip into a track that is a non-matching track in the timeline sequence, wherein the non-matching track comprises a track that is not associated with a track where the first clip is located, wherein the first clip or the second clip comprises embedded timeline sequences, wherein the selection of the first clip in the first track comprises a detection of a selector selection, wherein, after the selection of the first clip in the first track, the selection of the second clip comprises selecting the second clip when a selector cursor moves to a track compatible with the second clip, wherein audio tracks are compatible with audio clips, and wherein video tracks are compatible with video clips, and wherein a position of the first clip is locked in the timeline sequence when the selector cursor is moved to a track that is incompatible with the first clip, wherein the first clip is locked to a lowest compatible track.

13. A method comprising:

in response to selection of a first clip, drag the first clip in a timeline sequence, wherein the timeline sequence comprises a plurality of matched audio and video tracks, wherein the plurality of matched audio and video tracks in the timeline sequence are configured to serve as containers for clips, wherein the first clip is associated with a second clip;

in response to selection of the second clip, drag the second clip into a non-matching track in the timeline sequence before the first clip is dropped into a first track in the timeline sequence, wherein the non-matching track comprises a track that is not matched with a track at a position of the first clip;

in response to deselection of the first clip or second clip, drop the first clip in the first track and drop the second clip in the non-matching track, before dropping the first clip in the first track, detect movement of a selector cursor from tracks compatible with the first clip to tracks incompatible with the first clip, wherein audio tracks are compatible with audio clips, and wherein video tracks are compatible with video clips; and trigger the selection of the second clip when the selector cursor is detected to have moved to tracks incompatible with the first clip, wherein the first clip comprises a first video clip, the first track comprises a first video track, the second clip comprises a first audio clip, and wherein the timeline sequence further comprises a second track comprising a first audio track, wherein the matched audio and video tracks comprise the second and first tracks, and wherein the non-matching track comprises a second audio track.

14. A computer program product, encoded on a computer-readable medium, operable to cause data processing apparatus to perform operations comprising:

in response to selection of a first clip, drag the first clip in a timeline sequence, wherein the timeline sequence comprises a plurality of matched audio and video tracks, wherein the plurality of matched audio and video tracks in the timeline sequence are configured to serve as containers for clips, wherein the first clip is associated with a second clip;

in response to selection of the second clip, drag the second clip into a non-matching track in the timeline sequence before the first clip is dropped into a first track in the timeline sequence, wherein the non-matching track comprises a track that is not matched with a track at a position of the first clip;

in response to deselection of the first clip or second clip, drop the first clip in the first track and drop the second clip in the non-matching track, before dropping the first clip in the first track, detect movement of a selector cursor from tracks compatible with the first clip to tracks incompatible with the first clip, wherein audio tacks are compatible with audio clips, and wherein video tracks are compatible with video clips; and trigger the selection of the second clip when the selector cursor is detected to have moved to tracks incompatible with the first clip, wherein the first clip comprises a first video clip, the first track comprises a first video track, the second clip comprises a first audio clip, and wherein the timeline sequence further comprises a second track comprising a first audio track, wherein the matched audio and video tracks comprise the second and first tracks, and wherein the non-matching track comprises a second audio track.

15. A computer program product, encoded on a computer-readable medium, operable to cause data processing apparatus to perform operations comprising:

in response to selection of a first clip, dragging the first clip in a timeline sequence, wherein the timeline sequence comprises a plurality of matched audio and video tracks, wherein the plurality of matched audio and video tracks in the timeline sequence are configured to serve as containers for clips, wherein the first clip is associated with a second clip;

in response to selection of the second clip, dragging the second clip into a non-matching track in the timeline sequence before the first clip is dropped in a first track in the timeline sequence, wherein the non-matching track comprises a track that is not matched with a track at a position of the first clip;

in response to deselection of the first clip or second clip, dropping the first clip in the first track and dropping the second clip in the non-matching track; and further comprising locking the first clip into a lowest compatible track when the first clip is detected to be dragged to a track that is incompatible with the first clip, wherein the first clip comprises a first video clip, the first track comprises a first video track, the second clip comprises a first audio clip, and wherein the timeline sequence further comprises a second track comprising a first audio track, wherein the matched audio and video tracks comprise the second and first tracks, and wherein the non-matching track comprises a second audio track.

16. A system comprising:

a user interface device; and one or more computers operable to interact with the user interface device and to:

in response to selection of a first clip, dragging the first clip in a timeline sequence, wherein the timeline sequence comprises a plurality of matched audio and video tracks, wherein the plurality of matched audio and video tacks in the timeline sequence are configured to serve as containers for clips, wherein the first clip is associated with a second clip;

in response to selection of the second clip, dragging the second clip into a non-matching track in the timeline sequence before the first clip is dropped in a first track in the timeline sequence, wherein the non-matching track comprises a track that is not matched with a track at a position of the first clip;

in response to deselection of the first clip or second clip, dropping the first clip in the first tack and dropping the second clip in the non-matching track; and further comprising locking the first clip into a lowest compatible track when the first clip is detected to be dragged to a track that is incompatible with the first clip, wherein the first clip comprises a first video clip, the first track comprises a first video track, the second clip comprises a first audio clip, and wherein the timeline sequence further comprises a second track comprising a first audio track, wherein the matched audio and video tracks comprise the second and first tracks, and wherein the non-matching track comprises a second audio track.

* * * * *